US007324490B2

(12) United States Patent
Nishida et al.

(10) Patent No.: US 7,324,490 B2
(45) Date of Patent: Jan. 29, 2008

(54) COMMUNICATION SYSTEM, ADDRESS MANAGEMENT METHOD, RELAY DEVICE, AND MANAGEMENT DEVICE

(75) Inventors: Katsutoshi Nishida, Yokohama (JP); Takatoshi Okagawa, Yokosuka (JP); Manhee Jo, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 868 days.

(21) Appl. No.: 10/780,293

(22) Filed: Feb. 17, 2004

(65) Prior Publication Data
US 2004/0240393 A1   Dec. 2, 2004

(30) Foreign Application Priority Data
Feb. 18, 2003   (JP)   ............... 2003-040185

(51) Int. Cl.
H04B 3/20   (2006.01)
H04L 12/54   (2006.01)
H04L 12/56   (2006.01)
H04L 12/26   (2006.01)
H04J 3/24   (2006.01)
H04Q 7/24   (2006.01)

(52) U.S. Cl. ............... 370/338; 370/392; 370/401; 370/475; 709/245

(58) Field of Classification Search ............... 370/253, 370/475, 338, 392, 401
See application file for complete search history.

(56) References Cited

U.S. PATENT DOCUMENTS 6,434,627 B1 *   8/2002   Millet et al. ............... 709/245
2002/0154638 A1 *   10/2002   Shahrier et al. ............ 370/400
2002/0191576 A1 *   12/2002   Inoue et al. ................. 370/338
2002/0199015 A1 *   12/2002   Tari et al. .................... 709/238

FOREIGN PATENT DOCUMENTS

JP   2001-45050 A   2/2001

OTHER PUBLICATIONS

Levkowetz et al., IETF draft, draft-ieft-mobileip-nat-traversal-00.txt, May 2, 2002.*
Egevang, K., et al., "The IP Network Address Translator (NAT)", *Network Working Group, Request For Comments*, No. 1631, May 1994, 10 pages.
Srisuresh, P., et al., "IP Network Address Translator (NAT) Terminology and Considerations", *Network Working Group, Request For Comments*, No. 2663, Aug. 1999, 30 pages.
Japanese Office Action dated Dec. 19, 2006.
Okagawa et al. "IP Packet Routing Mechanism For IP2," IEICE Tech. Rep., MoMu C2002-63, Nov. 15, 2002, pp. 39-44.

* cited by examiner

*Primary Examiner*—Seema S. Rao
*Assistant Examiner*—Jianye Wu
(74) *Attorney, Agent, or Firm*—Brinks Hofer Gilson & Lione

(57) ABSTRACT

A relay device acquires and stores address binding information indicating correspondence between a static communication address and a dynamic communication address of a mobile terminal which is linked to the relay device. The relay device also stores address binding information of other mobile terminals to which packets are sent from the source terminal. A management server stores the address binding information pertaining to the source terminal, and also stores the communication status information of the other mobile terminals with which the terminal is communicating. When the terminal terminates communication, the relay device and the server delete the address binding information pertaining to the source terminal by cooperating with each other.

16 Claims, 17 Drawing Sheets

| MOBILE TERMINAL | TERMINAL IDENTIFICATION ADDRESS | PACKET TRANSFER ADDRESS | LINKED AR |
|---|---|---|---|
| 40a | AAAAA | AR30a001 | AR30a |
| 40b | BBBBB | AR30b001 | AR30b |
| 40c | CCCCC | AR30c001 | AR30c |
| 40d | DDDDD | AR30d001 | AR30d |
| 40e | EEEEE | AR30b002 | AR30b |
| 40f | FFFFF | AR30a002 | AR30a |
| ⋮ | ⋮ | ⋮ | ⋮ |

FIG. 4

ADDRESS - MANAGEMENT - RECORD RELEASE REQUEST MESSAGE

| ADDRESS OF MANAGEMENT SERVER 20 | ADDRESS OF SOURCE AR 30 | TERMINAL IDENTIFICATION ADDRESS OF MOBILE TERMINAL 40 (COMMUNICATION CLOSING TERMINAL) | OPTION FIELD |
|---|---|---|---|

FIG. 5

TERMINAL ENTRY DELETION REQUEST MESSAGE

| ADDRESS OF DESTINATION AR 30 | ADDRESS OF MANAGEMENT SERVER 20 | TERMINAL IDENTIFICATION ADDRESS OF MOBILE TERMINAL 40 (COMMUNICATION CLOSING TERMINAL) | OPTION FIELD |
|---|---|---|---|

FIG. 6

TERMINAL ENTRY CREATION REQUEST MESSAGE

| ADDRESS OF MANAGEMENT SERVER 20 | ADDRESS OF AR 30 LINKED WITH DESTINATION TERMINAL | TERMINAL IDENTIFICATION ADDRESS OF DESTINATION TERMINAL | TERMINAL IDENTIFICATION ADDRESS OF SOURCE TERMINAL | PACKET TRANSFER ADDRESS OF SOURCE TERMINAL | OPTION FIELD |
|---|---|---|---|---|---|

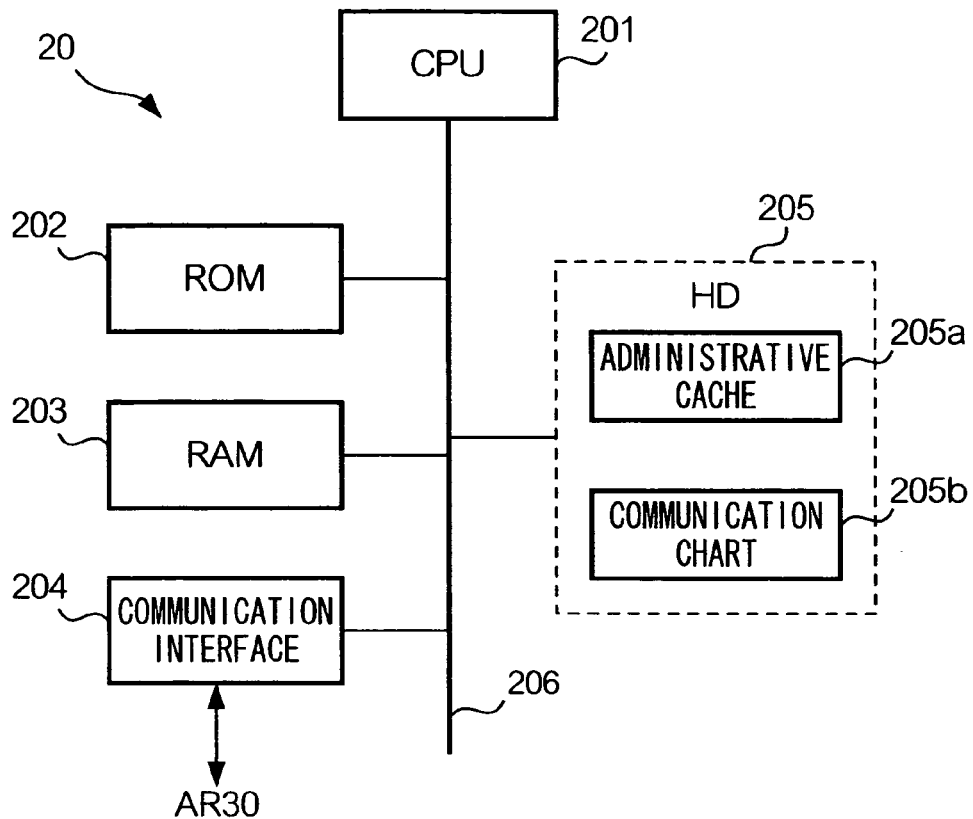

| MOBILE TERMINAL | 40a | 40b | 40c | 40d | 40e | 40f | ... |
|---|---|---|---|---|---|---|---|
| 40a | − | 0 | 0 | 0 | 0 | 0 | ... |
| 40b | 0 | − | 1 | 0 | 0 | 0 | ... |
| 40c | 0 | 1 | − | 1 | 1 | 0 | ... |
| 40d | 0 | 0 | 1 | − | 0 | 0 | ... |
| 40e | 0 | 0 | 1 | 0 | − | 1 | ... |
| 40f | 0 | 0 | 0 | 0 | 1 | − | ... |
| ⋮ | ... | ... | ... | ... | ... | ... | ... |

| MOBILE TERMINAL | 40a | 40b | 40c | 40d | 40e | 40f | ... |
|---|---|---|---|---|---|---|---|
| 40a | − | 1 | 0 | 0 | 0 | 0 | ... |
| 40b | 1 | − | 1 | 0 | 0 | 0 | ... |
| 40c | 0 | 1 | − | 1 | 1 | 0 | ... |
| 40d | 0 | 0 | 1 | − | 0 | 0 | ... |
| 40e | 0 | 0 | 1 | 0 | − | 1 | ... |
| 40f | 0 | 0 | 0 | 0 | 1 | − | ... |
| ⋮ | ... | ... | ... | ... | ... | ... | ... |

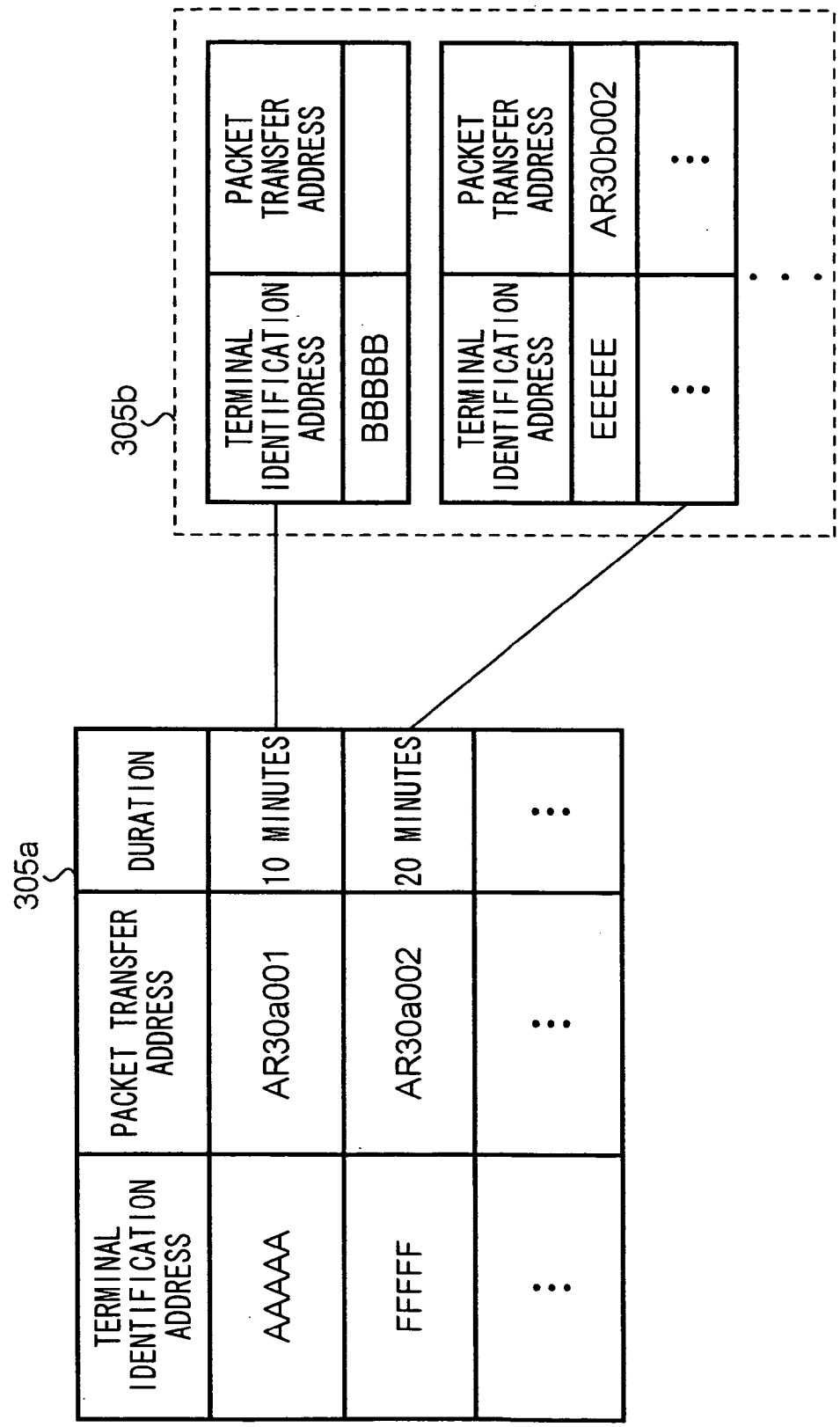

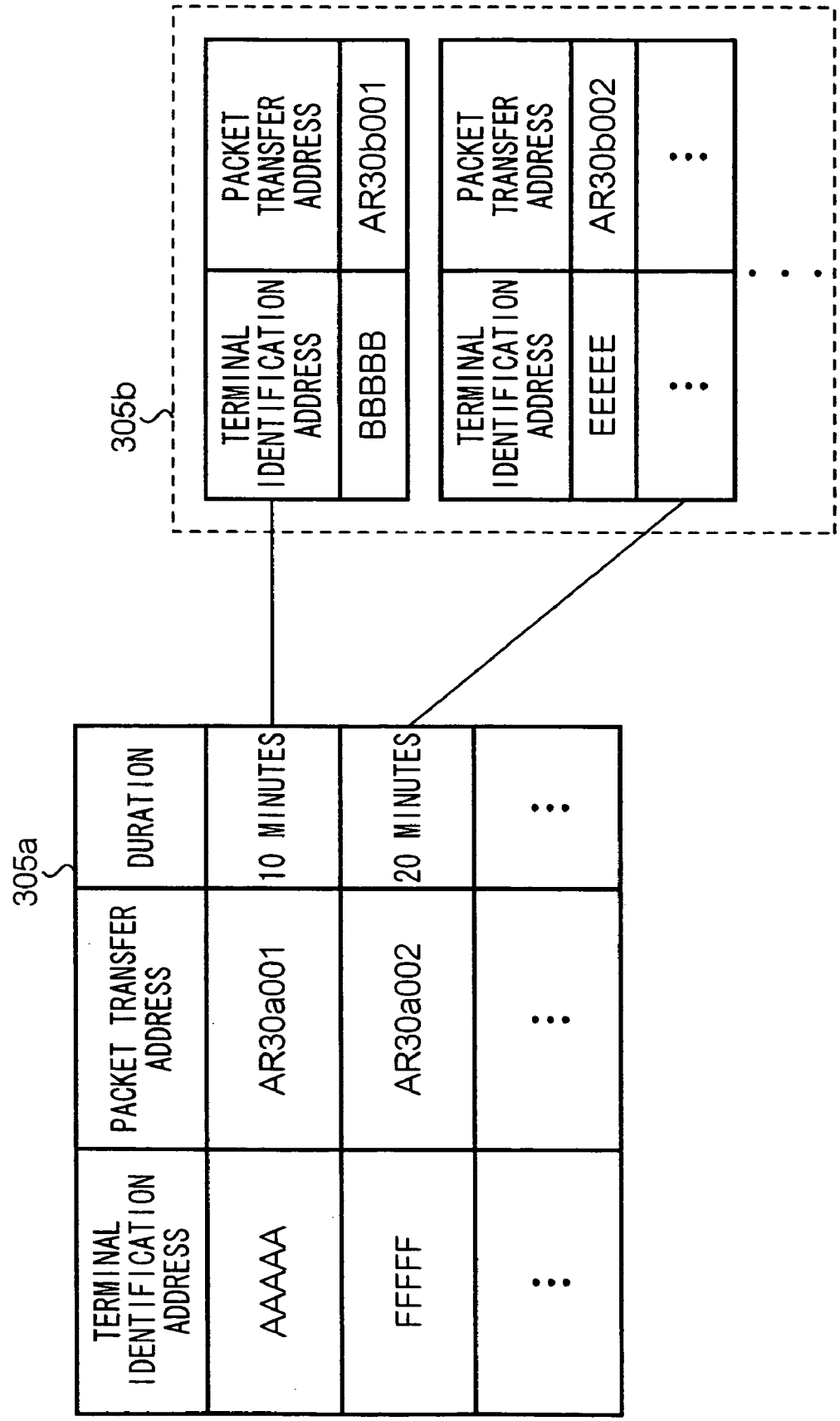

| MOBILE TERMINAL | TERMINAL IDENTIFICATION ADDRESS | PACKET TRANSFER ADDRESS | LINKED AR |
|---|---|---|---|
| 40b | BBBBB | AR30b001 | AR30b |
| 40c | CCCCC | AR30c001 | AR30c |
| 40d | DDDDD | AR30d001 | AR30d |
| 40e | EEEEE | AR30b002 | AR30b |
| 40f | FFFFF | AR30a002 | AR30a |
| ⋮ | ⋮ | ⋮ | ⋮ |

| MOBILE TERMINAL | 40b | 40c | 40d | 40e | 40f | ... |
|---|---|---|---|---|---|---|
| 40b | — | 1 | 0 | 0 | 0 | ... |
| 40c | 1 | — | 1 | 1 | 0 | ... |
| 40d | 0 | 1 | — | 0 | 0 | ... |
| 40e | 0 | 1 | 0 | — | 1 | ... |
| 40f | 0 | 0 | 0 | 1 | — | ... |
| ⋮ | ... | ... | ... | ... | ... | ... |

COMMUNICATION SYSTEM, ADDRESS MANAGEMENT METHOD, RELAY DEVICE, AND MANAGEMENT DEVICE

TECHNICAL FIELD

The present invention relates to a method for managing a static communication address and a dynamic communication address in a communication network that mediates packets by inter-translating the addresses.

BACKGROUND ART

There is now in place a technique for transferring packets sent from source terminals to destination terminals by using a static communication address (terminal identification address), which is pre-assigned to a mobile terminal, and by which the terminal can be identified uniquely, and a dynamic communication address (packet transfer address) assigned to the terminal temporarily. As regarding such a technique, RFC 1631 discloses in "The IP Network Translator (NAT)", a NAT having a function for, when receiving a packet from a mobile terminal, translating into a packet transfer address a terminal identification address designated in a source address of the packet. As a technique derived from the one disclosed by RFC 1631, RFC 2663 discloses in "The IP Network Address Translator (NAT) Terminology and Considerations", a network address translator (Twice NAT) having a function for translating, on the basis of an address translation table preset in a cache table, not only a terminal identification address designated in a source address of a packet, but also a terminal identification address designated in a destination address of the packet into corresponding packet transfer addresses.

However, in a case where the above addresses are managed by only the NATs disclosed by RFCs 1631 and 2663, the NATs need to translate addresses each time a packet is sent, which imposes a burden on the NATs.

It therefore becomes necessary to manage addresses without imposing a burden on NATs.

As an example of such an address management method, Japanese Patent Application Laid-Open Publication No. 2001-45050 discloses a technique for managing IP addresses assigned to mobile terminals. In the technique disclosed in the publication, the IP address of IP terminal 1 is managed by using address management server 5, location management server 4, IP packet transfer device 3, and access point 2. Specifically, address management server 5 comprises an address management table for storing IP addresses of terminals for each closed user group (CUG) to which the users of the terminals belong. The address management server 5, on the basis of the table, specifies the CUG associated with the user ID of IP terminal 1 requesting an address, and assigns to IP terminal 1 the IP address for the specified CUG. Location management server 4, on the basis of information sent from access point 2, generates location information of an IP address, which is information indicating access point 2 currently serving IP terminal 1 to which the IP address is assigned. Packet transfer device 3 comprises an IP packet transfer table for storing the CUG associated with the user ID of IP terminal 1, the IP address assigned to IP terminal 1, and location information of the IP address. Packet transfer device 3 transfers packets on the basis of the IP packet transfer table. Access point 2 stores a served user management table for storing information such as user IDs and IP addresses of IP terminals 1 served by access point 2. Access point 2 transfers packets on the basis of the served user management table. When an IP address is no longer required as a result of a communication termination of IP terminal 1, access point 2 notifies IP address management server 5 of the fact. IP address management server 5 then returns the IP address into an unused IP address pool. IP packet transfer device 3 updates its IP packet transfer table, and access point 2 updates its served user management table. Consequently, the IP address is released.

In a case where, as disclosed in RFCs 1631 and 2663, mobile communication is performed by using a terminal identification address of a mobile terminal and a packet transfer address assigned to the terminal, and the addresses are managed as disclosed in the publication. The following communication system is possible by comprising a management device, and relay devices. The management device is provided in a network for managing correspondence (hereinafter, referred to as "address binding information") between a terminal identification address assigned to a mobile terminal linked to the network, and a packet transfer address. The management server, in response to an inquiry from a relay device, sends to the relay device address binding information. The relay device stores the address binding information. In the communication system, a mobile terminal sends a packet by using terminal identification addresses as a source address and a destination address. A relay device linked to the terminal translates the terminal identification addresses into packet transfer addresses, and sends the resultant packet to a terminal to which the packet is addressed. A relay device linked to the destination terminal, upon receiving the transferred packet, translates packet transfer addresses of the packet into terminal identification addresses, and sends the resultant packet to the destination terminal.

These relay devices store two pieces of information: address binding information of a source terminal of a packet, and address binding information of a destination terminal of the packet. A relay device can assess a memory capacity requirement for storing address binding information of source terminals linked to the relay device. On the other hand, it is difficult for a relay device to assess a memory capacity requirement for storing address binding information of destination terminals of packets, because the number of destination terminals to which packets are addressed is not fixed. Thus, unless a memory capacity of a relay device is increased sufficiently, the device may run out of memory capacity. Also, in a case where a relay device inquires address information from a management device each time the relay device receives packets from mobile terminals, there may occur a problem of congestion on a network because of the movement of large numbers of signals from the inquiries.

In a case where a management device continues to store address binding information of mobile terminals which have terminated communication, there occurs another problem that the relay device runs out of memory capacity for storing any subsequent address binding information. Consequently, there can be conceived a configuration where, when a mobile terminal terminates communication with one communication partner among a plurality of partners, a relay device linked to the terminal requests a management server to delete address binding information of the terminal stored in the server. However, if such a request is sent to the management server each time a mobile terminal terminates communication with a communication partner, a problem of congestion on the network because of the movement of large numbers of signals from the requests would occur.

In a case where a packet transfer address assigned to a mobile terminal is changed, and the change is not reflected in address binding information correctly, the mobile terminal may receive no packets addressed to the terminal.

SUMMARY

The present invention has been made in view of the problems stated above, and provides a method and system, in a communication network that mediates packets between mobile terminals, for avoiding a significant increase in traffic, solving the problem of having to provide huge memory capacities, and avoiding packet losses due to changes of packet transfer addresses.

To solve the above problems, the present invention provides a communication system comprising: a plurality of relay devices each of which has a relay memory and modifies packets sent from mobile terminals linked to the each relay device on the basis of content stored in the relay memory; and a management device having a management memory, wherein each of the plurality of relay devices comprises: first means for acquiring and storing in the relay memory, address binding information indicating correspondence between a static communication address uniquely pre-assigned to a mobile terminal linked to the relay device and a dynamic communication address assigned to the mobile terminal while located in a communication area covered by the relay device; second means for sending to the management device, destination terminal information indicating a destination address of a packet sent from the mobile terminal, receiving destination terminal information replied from the management device, and storing as address binding information of a communication partner of the mobile terminal, in association with the address binding information, address binding information indicating correspondence between the destination address and a dynamic communication address indicated by the received destination terminal information; third means, when the mobile terminal terminates communication, for releasing in the relay memory a memory area storing the address binding information of the mobile terminal and a memory area storing the address binding information of the communication partner associated with the address binding information of the mobile terminal, and requesting the management device to delete the address binding information of the mobile terminal; and fourth means, when requested by the management device to delete address binding information of another mobile terminal which is linked to another relay device and terminates communication, for releasing in the relay memory a memory area storing the address binding information of the another mobile terminal associated with the address binding information of the mobile terminal, the management device comprises: fifth means, in a network having a plurality of relay devices each of which is linked to mobile terminals, for storing in the management memory, address binding information indicating correspondence between static communication addresses assigned to the mobile terminals and dynamic communication addresses assigned to the mobile terminals, and communication status information indicating communication partners of the mobile terminals; sixth means, when receiving from a relay device, destination terminal information of a packet sent from a mobile terminal linked to the relay device, for reading from the management memory, a dynamic communication address corresponding to a destination address indicated by the destination terminal information, and sending to the relay device, destination terminal information indicating the dynamic communication address; and seventh means, when requested by a relay device to delete address binding information of a mobile terminal which terminates communication, for identifying a communication partner of the mobile terminal on the basis of communication status information of the mobile terminal stored in the management memory, for identifying a relay device linked to the communication partner on the basis of address binding information of the communication partner stored in the management memory, for requesting the relay device to delete the address binding information of the communication terminating mobile terminal, and for releasing in the management memory a memory area storing the address binding information of the communication terminating mobile terminal and a memory area for storing the communication status information of the communication terminating mobile terminal.

The present invention further provides an address management method comprising: a first step of, in a network having a plurality of relay devices each of which is linked to mobile terminals, storing, with a management device having a management memory, in the management memory, address binding information indicating correspondence between static communication addresses uniquely pre-assigned to the mobile terminals and dynamic communication addresses assigned to the mobile terminals while located in communication areas covered by the plurality of relay devices, and communication status information indicating communication partners of the mobile terminals; a second step of acquiring and storing, with a first relay device having a relay memory, in the relay memory, address binding information indicating correspondence between a static communication address assigned to a first mobile terminal linked to the first relay device, and a dynamic communication address assigned to the first mobile terminal; a third step of sending, with the first relay device, to the management device, destination terminal information indicating a destination address of a packet sent from the first mobile terminal; a fourth step of, when receiving the destination terminal information from the first relay device, reading, with the management device, from the management memory a dynamic communication address corresponding to the destination address indicated by the destination terminal information, and sending to the first relay device, destination terminal information indicating the dynamic communication address; a fifth step of receiving, with the first relay device, the destination terminal information replied from the management device, and storing as address binding information of a communication partner of the first mobile terminal, in association with the address binding information, address binding information indicating correspondence between the destination address and the dynamic communication address indicated by the received destination terminal information; a sixth step of, when the first mobile terminal terminates communication, releasing, with the first relay device, in the relay memory a memory area storing the address binding information of the first mobile terminal and a memory area storing the address binding information of the communication partner associated with the address binding information of the first mobile terminal, and requesting the management device to delete the address binding information of the first mobile terminal; a seventh step of, when requested by the first relay device to delete the address binding information of the first mobile terminal, identifying, with the management device, a second mobile terminal which is a communication partner of the first mobile terminal on the basis of the communication status information of the first mobile terminal stored in the management memory, identifying a second relay device linked to the second mobile terminal on the basis of address binding information of the second mobile terminal stored in the management memory, sending to the second relay device a request for deleting the address binding information of the second mobile terminal along with information for identifying the second mobile terminal, and releasing in the management memory a memory area storing the address binding information of the first mobile terminal and a memory area for storing the communication status information of the first mobile terminal; and an eighth step of, when receiving the request and the information for identifying the second mobile terminal, releasing, with the second mobile terminal, a memory area storing the address binding information of the first mobile terminal associated with address binding information of the second mobile terminal.

The present invention further provides a relay device which has a relay memory, and modifies and transfers packets sent from mobile terminals linked to the relay device on the basis of content stored in the relay memory, the relay device comprising: first means for acquiring and storing in the relay memory, address binding information indicating correspondence between a static communication address uniquely pre-assigned to a mobile terminal linked to the relay device and a dynamic communication address assigned to the mobile terminal while located in a communication area covered by the relay device; second means for sending to a management device having a management memory, destination terminal information indicating a destination address of a packet sent from the mobile terminal, for receiving destination terminal information replied from the management device, and for storing as address binding information of a communication partner of the mobile terminal, in association with address binding information of the mobile terminal, address binding information indicating correspondence between the destination address and a dynamic communication address indicated by the received destination terminal information; third means, when the mobile terminal terminates communication, for releasing in the relay memory a memory area storing the address binding information of the mobile terminal and a memory area storing the address binding information of the communication partner associated with the address binding information of the mobile terminal, and for requesting the management device to delete the address binding information of the mobile terminal; and fourth means, when requested by the management device to delete address binding information of another mobile terminal which is linked to another relay device and terminates communication, for releasing in the relay memory a memory area storing the address binding information of the another mobile terminal associated with the address binding information of the mobile terminal.

The present invention further provides a management device having a management memory, comprising: first means, in a network having a plurality of relay devices each of which is linked to mobile terminals, for storing in the management memory, address binding information indicating correspondence between static communication addresses uniquely pre-assigned to the mobile terminals and dynamic communication addresses assigned to the mobile terminals while located in communication areas covered by the plurality of relay devices, and communication status information indicating communication partners of the mobile terminals; second means, when receiving from a relay device, destination terminal information of a packet sent from a mobile terminal linked to the relay device, for reading from the management memory, a dynamic communication address corresponding to a destination address indicated by the destination terminal information, and for sending to the relay device, destination terminal information indicating the dynamic communication address; and third means, when requested by a relay device to delete address binding information of a mobile terminal which terminates communication, for identifying a communication partner of the mobile terminal on the basis of communication status information of the mobile terminal stored in the management memory, for identifying a relay device linked to the communication partner on the basis of address binding information of the communication partner stored in the management memory, for requesting the relay device to delete the address binding information of the communication terminating mobile terminal, and for releasing in the management memory a memory area storing the address binding information of the communication terminating mobile terminal and a memory area for storing the communication status information of the communication terminating mobile terminal.

According to the present invention, a relay device acquires and stores in the relay memory, address binding information indicating correspondence between a static communication address uniquely pre-assigned to a mobile terminal linked to the relay device and a dynamic communication address assigned to the mobile terminal while located in a communication area covered by the relay device. The relay device sends to the management device, destination terminal information indicating a destination address of a packet sent from the mobile terminal; receives destination terminal information replied from the management device; and stores as address binding information of a communication partner of the mobile terminal, in association with the address binding information, address binding information indicating correspondence between the destination address and a dynamic communication address indicated by the received destination terminal information. The relay device, when the mobile terminal terminates communication, releases in the relay memory a memory area storing the address binding information of the mobile terminal and a memory area storing the address binding information of the communication partner associated with the address binding information of the mobile terminal; and requests the management device to delete the address binding information of the mobile terminal. The relay device, when requested by the management device to delete address binding information of another mobile terminal which is linked to another relay device and terminates communication, releases in the relay memory a memory area storing the address binding information of the another mobile terminal associated with the address binding information of the mobile terminal.

On the other hand, a management device, in a network having a plurality of relay devices each of which is linked to mobile terminals, stores in the management memory, address binding information indicating correspondence between static communication addresses assigned to the mobile terminals and dynamic communication addresses assigned to the mobile terminals, and communication status information indicating communication partners of the mobile terminals. The management device, when receiving from a relay device, destination terminal information of a packet sent from a mobile terminal linked to the relay device, reads from the management memory, a dynamic communication address corresponding to a destination address indicated by the destination terminal information; and sends to the relay device, destination terminal information indicating the dynamic communication address. The management device, when requested by a relay device to delete address binding information of a mobile terminal which terminates communication, identifies a communication partner of the mobile terminal on the basis of communication status information of the mobile terminal stored in the management memory; identifies a relay device linked to the communication partner on the basis of address binding information of the communication partner stored in the management memory; requests the relay device to delete the address binding information of the communication terminating mobile terminal; and releases in the management memory a memory area storing the address binding information of the communication terminating mobile terminal and a memory area for storing the communication status information of the communication terminating mobile terminal.

As described above, relay devices, in cooperation with a management device, store address binding information of mobile terminals that are linked to the relay devices in accordance with address binding information of communication partners of the terminals.

BRIEF DESCRIPTION OF THE DRAWINGS

FIG. 4 is a diagram showing an example of data configuration of an address-management-record release request message used in communication system 1 according to the embodiment.

FIG. 5 is a diagram showing an example of data configuration of a terminal entry deletion request message used in communication system 1 according to the embodiment.

FIG. 6 is a diagram showing an example of data configuration of a terminal entry creation request message used in communication system 1 according to the embodiment.

FIG. 7 is a block diagram showing an example of hardware configuration of management server 20 according to the embodiment.

FIG. 9 is a diagram showing an example of data configuration of communication chart 205b stored in management server 20 according to the embodiment.

FIG. 14 is a diagram showing an example of communication chart 205b stored in management server 20 according to the embodiment.

FIG. 15 is a diagram showing an example of cache for source terminal 305a and cache for destination terminal 305b stored in AR 30a according to the embodiment.

FIG. 16 is a diagram showing an example of communication chart 205b stored in management server 20 according to the embodiment.

FIG. 17 is a diagram showing an example of cache for source terminal 305a and cache for destination terminal 305b stored in AR 30a according to the embodiment.

FIG. 21 is a diagram showing an example of administrative cache 205a stored in management server 20 according to the embodiment.

FIG. 22 is a diagram showing an example of communication chart 205b stored in management server 20 according to the embodiment.

DESCRIPTION OF PREFERRED EMBODIMENTS

Figure 1:
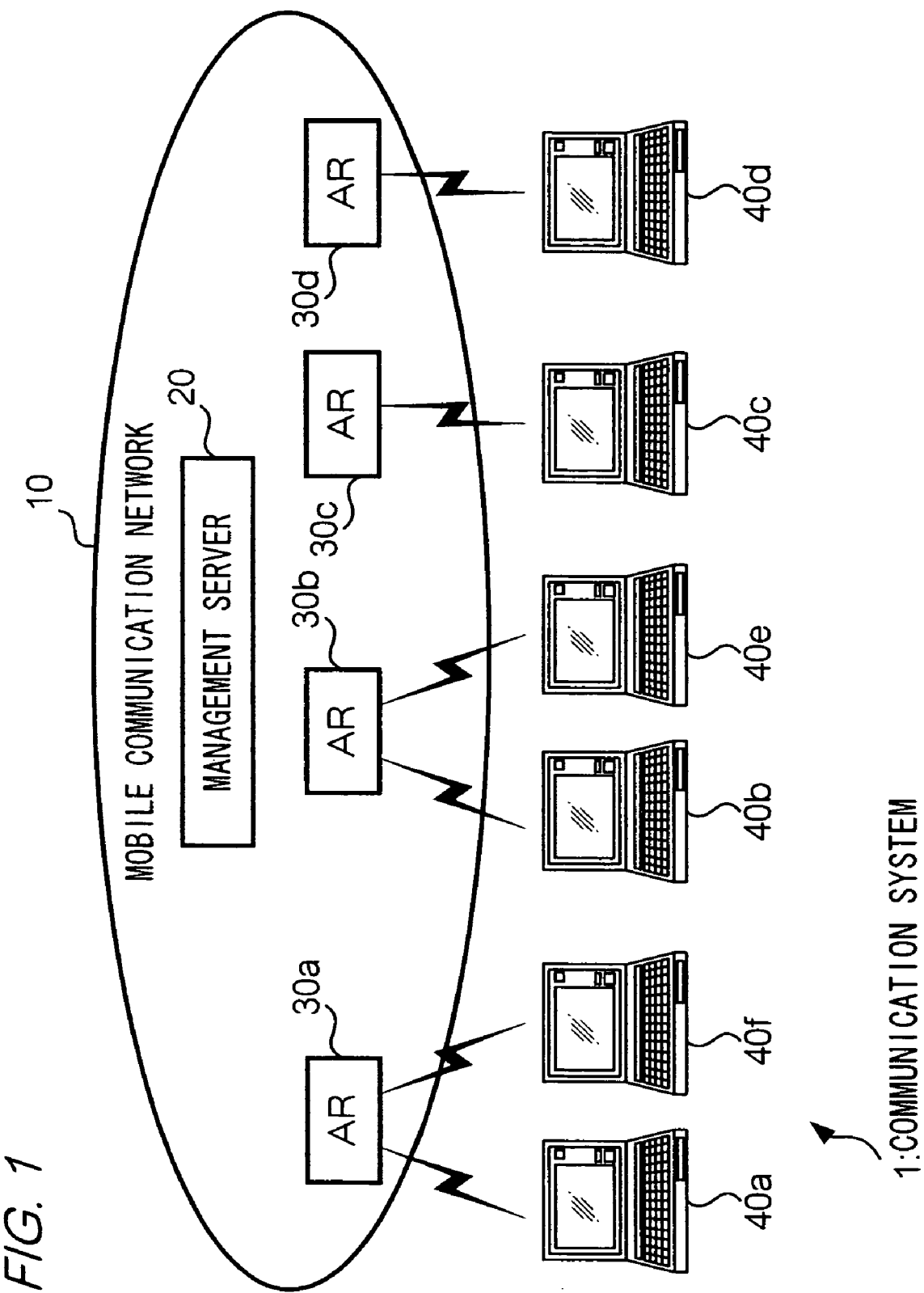
FIG. 1 is a block diagram showing an example of a configuration of communication system 1 according to an embodiment of the present invention.

Following description is made of a preferred embodiment according to the present invention with reference to the attached drawings. In the drawings, like elements are denoted by like numerals.

1. Configuration

Configuration of Communication System:

FIG. 1 is a block diagram showing an example of a configuration of a communication system according to an embodiment of the present invention. In this specification, if not necessary to make a distinction, ARs 30a to 30d are described as "AR 30", mobile terminals 40a to 40f are described as "mobile terminal 40".

Mobile communication network 10 is a communication network for providing mobile packet communication services to mobile terminals 40. Mobile communication network 10 comprises access routers (ARs) 30 and management server 20. It should be noted that description and illustration of a plurality of routers for relaying packets transferred from ARs 30 are omitted for convenience.

AR 30 is a relay device which covers a communication area including a wireless area, and relays packets exchanged by mobile terminals 40 located in the communication area and permitted by AR 30 to communicate (description will be given later of the communication permission). Hereinafter, mobile terminal 40, which is located in a communication area covered by AR 30 and permitted by AR 30 to communicate, will be referred to as "mobile terminal 40 linked to AR 30".

AR 30 has a function, when relaying a packet sent from mobile terminal 40, of translating into a packet transfer address, a terminal identification address of terminal 40 designated in a source address of the packet; of translating into a packet transfer address, a terminal identification address of destination mobile terminal 40 designated in a destination address of the packet; and of transferring the packet to destination terminal 40, in addition to similar functions to those of a standard router. AR 30 also has a function, when receiving a packet addressed to mobile terminal 40 linked to AR 30, of translating into a terminal identification address, a packet transfer address of terminal 40 designated in a destination address of the packet; and of transferring the packet to terminal 40. Description will be given later of a specific method of translating addresses.

A packet transfer address is a communication address indicating a connection point of mobile terminal 40, when linked to AR 30, in a wireless area covered by AR 30. The address is a dynamic communication address assigned by AR 30 to mobile terminal 40, so that terminal 40 is uniquely identifiable while linked to AR 30.

A terminal identification address is a static communication address pre-assigned to mobile terminal 40, so that terminal 40 is uniquely identifiable.

Management server 20 is a server for managing, address information of mobile terminals 40 linked to mobile communication network 10 via ARs 30, and communication statuses of terminals 40. The address information managed by management server 20 will be described later. The communication statuses indicate whether mobile terminals 40 are able to communicate, and communication partners of mobile terminals 40. A specific method of managing communication statuses will be described later.

Mobile terminal 40 is, for example, a notebook personal computer having a packet communication function. As shown in FIG. 1, mobile terminal 40a, when linked to AR 30a, can perform packet communications via AR 30a with other mobile terminals 40 linked to other ARs 30 in mobile communication network 10.

Figures 2, 8:
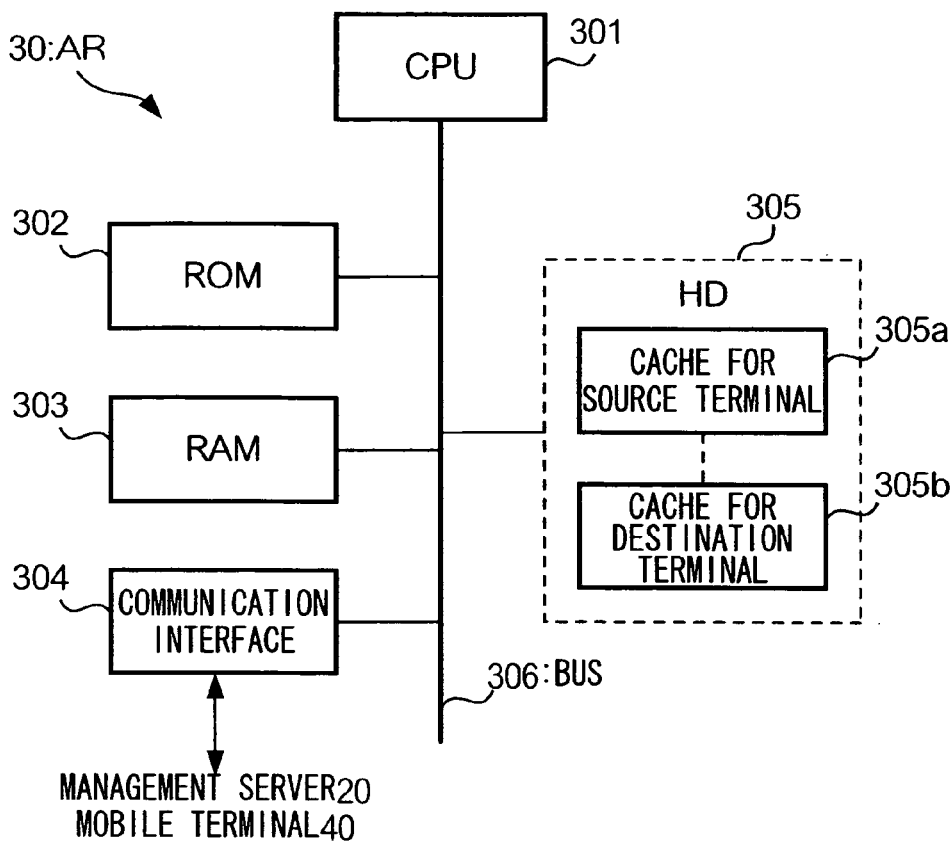
FIG. 2 is a block diagram showing an example of a hardware configuration of AR 30 according to the embodiment.
FIG. 8 is a diagram showing an example of data configuration of administrative cache 205a stored in management server 20 according to the embodiment.

Configuration of AR:

FIG. 2 is a block diagram showing an example of a hardware configuration of AR 30.

CPU 301 controls components of AR 30 connected to one another through bus 306 by executing a variety of programs stored in ROM 302 or hard disk (HD) 305. CPU 301 also has a timer function for counting elapsed time. ROM 302 stores programs such as a program for basic control over each component of AR 30. RAM 303 is used as a work area for CPU 301. Communication interface 304 controls communications, for example, with management server 20 or mobile terminals 40. It should be noted that AR 30 may further comprise an operation input unit or a display unit.

HD 305 stores cache for source terminal 305a and cache for destination terminal 305b in addition to a variety of software such as an operating system.

Figure 3:
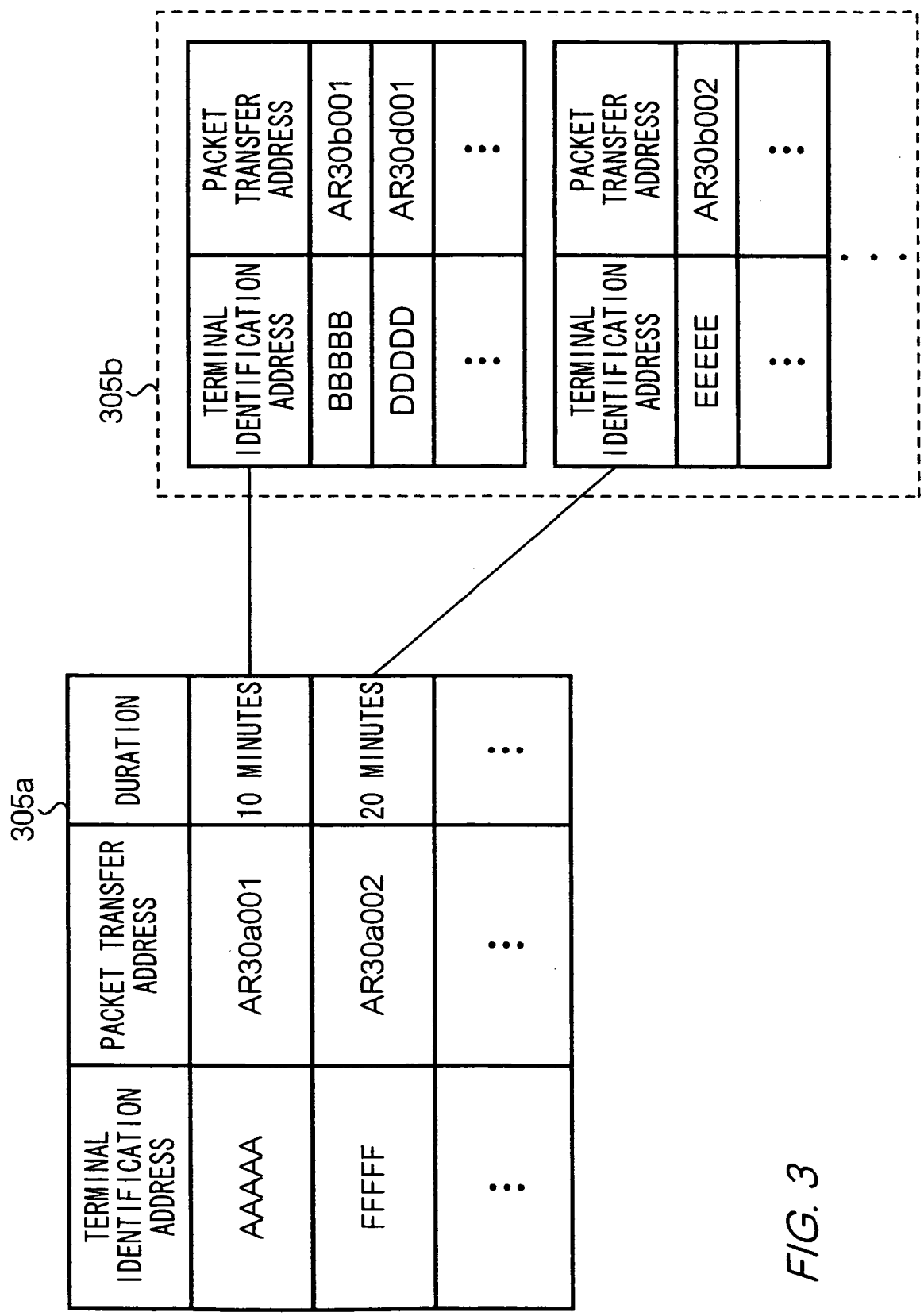
FIG. 3 is a diagram showing an example of data configurations of cache for source terminal 305a and cache for destination terminal 305b stored in AR 30 according to the embodiment.

As shown in FIG. 3, cache for source terminal 305a stores records pertaining to addresses of mobile terminals 40 linked to AR 30 (hereinafter, referred to as "source terminal records"). In each of the source terminal records, the terminal identification address and the packet transfer address of each terminal 40 are written. Hereinafter, for convenience, information indicating correspondence between a terminal identification address and a packet transfer address will be referred to as "address binding information". In each of the source terminal records, time information (duration) is also written indicating a period of time during which each record is stored in cache for source terminal 305a. As duration, a predetermined period of time (for example, ten seconds, ten minutes, one hour, or one day) from a time at which each record is registered in cache for source terminal 305a is set, and counted by the timer function of CPU 301. In a case where a source terminal record is not used for a predetermined period of time, the source record is deleted from cache for source terminal 305a. While a source terminal record is used, the duration of the source terminal record is not counted. Also, in a case where AR 30 receives from a source terminal a communication termination message notifying that the terminal is terminating communication, a source terminal record of the terminal is deleted from cache for source terminal 305a.

It should be noted that deletion of data such as a source terminal record specifically means that a memory area for storing the data is released, and the memory area becomes available for storing new data.

As shown in FIG. 3, cache for destination terminal 305b stores, in accordance with each source terminal whose addresses are stored in cache for source terminal 305a, records pertaining to addresses of mobile terminals 40 communicating with each source terminal (hereinafter, referred to as "destination terminal records"). In each of the destination terminal records, the terminal identification address and the packet transfer address of each terminal 40 are written.

With the above configuration, each destination terminal record in cache for destination terminal 305b is associated with each source terminal record in cache for source terminal 305a. Cache for destination terminal 305b is then stored in HD 305 in accordance with cache for source terminal 305a.

HD 305 also stores a relay management program. The program is executed by CPU 301 to cause AR 30 to realize the following functions.

When AR 30 receives from mobile terminal 40 located in a wireless area covered by AR 30, a communication initiation request message requesting initiation of communication, AR 30 sends to management server 20 an assignment permit request message requesting permission of assigning a packet transfer address to terminal 40. AR 30, upon receiving as a response to the message an assignment permit message notifying permission of the assignment, assigns a packet transfer address to terminal 40. AR 30 then registers in cache for source terminal 305a, a source terminal record including the terminal identification address of terminal 40 included in the communication initiation request message, the assigned packet transfer address, and time information indicating duration. AR 30 sends to management server 20, an address notification message including the terminal identification address and the packet transfer address. AR 30 sends to terminal 40, a communication permit message notifying permission of communication initiation.

AR 30, upon receiving a packet from mobile terminal 40, determines whether a destination terminal record including a terminal identification address designated in a destination address of the packet (hereinafter, referred to as "the terminal identification address of a destination terminal") has been registered in cache for destination terminal 305b in accordance with a source terminal record of terminal 40. When the determination is No, AR 30 registers in cache for destination terminal 305b, the destination terminal record including the terminal identification address, in accordance with the source terminal record of terminal 40 (hereinafter, referred to as "a source terminal"). AR 30 then sends to management server 20, an address inquiry message to inquire about the packet transfer address corresponding to the terminal identification address of the destination terminal. The address inquiry message includes the terminal identification address of the destination terminal, the terminal identification address of the source terminal, and the address of AR 30. AR 30, upon receiving from management server 20, as response to the message, an address response message including the packet transfer address corresponding to the terminal identification address of the destination terminal, writes the packet transfer address in the destination terminal record registered in cache for destination terminal 305b. AR 30, translates the source address of the packet into the packet transfer address of the source terminal; translates the destination address of the packet into the packet transfer address of the destination terminal; and sends the resultant packet.

AR 30, upon receiving from mobile terminal 40 a communication termination message notifying termination of communication, sends to management server 20 an address-management-record release request message as shown in FIG. 4. The message includes the terminal identification address of terminal 40 which has sent the communication termination message. The address-management-record release request message requests management server 20 to delete information on terminal 40 registered in management server 20 (description of the information will be given later). When a plurality of mobile terminals 40, linked to a single AR 30, terminate communication virtually simultaneously, the terminal identification addresses of the plurality of terminals 40 may be designated in an option field of an address-management-record release request message. With the above configuration, it becomes possible to request deletion of information on the plurality of mobile terminals 40 by a single message.

AR 30, upon receiving from management server 20 a release request response message as a response to the message, deletes the source terminal record of terminal 40 registered in cache for source terminal 305a. AR 30 further deletes all destination terminal records registered in cache for destination terminal 305b in accordance with the source terminal record of terminal 40.

AR 30, upon receiving from management server 20 a terminal entry deletion request message requesting deletion of destination terminal records of mobile terminal 40, deletes the destination terminal records of terminal 40 from cache for destination terminal 305b. As shown in FIG. 5, the message includes the terminal identification address of terminal 40. AR 30 then sends to management server 20 a deletion completion message notifying completion of the deletion.

When a duration written in a source terminal record stored in cache for source terminal 305a elapses, AR 30 sends to management server 20 an address-management-record release request message. As described above, AR 30 then deletes the source terminal record from cache for source terminal 305a, and deletes all destination terminal records registered in cache for destination terminal 305b in accordance with the source terminal record.

Even when AR 30 does not receive a communication initiation request message from mobile terminal 40 located in a wireless area covered by AR 30, in a case where AR 30 is requested by management server 20 to assign a packet transfer address to terminal 40, AR 30 requests terminal 40 to initiate communication and assigns a packet transfer address to terminal 40 which has responded to the request. As described above, AR 30 then sends to management server 20 the packet transfer address of terminal 40.

AR 30, upon receiving from another AR 30 a packet addressed to mobile terminal 40 linked to AR 30, translates a destination terminal address and a source terminal address as described below.

AR 30 pre-stores in a source terminal record registered in cache for source terminal 305a, address binding information of terminal 40 (destination terminal) whose packet transfer address is designated in a destination terminal address of the packet. AR 30 also pre-stores in a destination terminal record registered in cache for destination terminal 305b, address binding information of mobile terminal 40 (source terminal) whose packet transfer address is designated in a source terminal address of the packet.

AR 30 reads the terminal identification address corresponding to the packet transfer address of the destination terminal with reference to cache for source terminal 305a. AR 30 also reads with reference to cache for destination terminal 305b, the terminal identification address corresponding to the packet transfer address of the source terminal from the destination terminal record of the source terminal registered in accordance with the source terminal record of the destination terminal registered in cache for source terminal 305a. AR 30, then translates the destination address of the packet into the acquired terminal identification address of the destination terminal, and translates the source address of the packet into the acquired terminal identification address of the source terminal. AR 30 then sends the resultant packet.

It should be noted that AR 30 records, before the above packet is sent, the destination terminal record of the source terminal whose packet transfer address is designated in the source address of the packet, as described below. AR 30 receives from management server 20, a terminal entry creation request message (described later) pertaining to the destination terminal as shown in FIG. 6. AR 30 creates the destination terminal record including the terminal identification address and the packet transfer address of the source terminal identified by the message. AR 30 registers in cache for destination terminal 305b, the destination terminal record in accordance with the source terminal record of the destination terminal identified by the message.

Configuration of Management Server:

FIG. 7 is a block diagram showing an example of a hardware configuration of management server 20.

CPU 201 controls components of management server 20 connected to one another through bus 206 by executing a variety of programs stored in ROM 202 or hard disk (HD) 205. ROM 202 stores programs such as a program for basic control over each component of management server 20. RAM 203 is used as a work area for CPU 201. Communication interface 204 controls communications, for example, with AR 30 or mobile communication network 10. It should be noted that management server 20 may further comprise an operation input unit or a display unit.

HD 205 stores administrative cache 205a and communication chart 205b in addition to a variety of software such as an operating system.

As shown in FIG. 8, administrative cache 205a stores records pertaining to mobile terminals 40 linked to ARs 30 in mobile communication network 10 (hereinafter, referred to as "address management records"). In each of the address management records, a terminal identification address and a packet transfer address of each of the terminals 40 (address binding information) and the address of AR 30 linked to each terminal 40 are written.

Communication chart 205b is a table for grasping, for each mobile terminal 40 linked to each AR 30 in mobile communication network 10, mobile terminals 40 communicating with terminal 40. FIG. 9 is a diagram showing communication chart 205b conceptually. In every row of the figure, a record (hereinafter, referred to as "communication status record") of mobile terminal 40 is listed, which is linked to any of ARs 30 in mobile communication network 10. Mobile terminal 40 listed in each column can be a communication partner. Mobile terminals 40 which can be communication partner are mobile terminals 40 linked to any of ARs 30 in mobile communication network 10. In the figure, in a case where mobile terminal 40 is communicating with another mobile terminal 40, the symbol "1" is set in an area of the other terminal 40, while the symbol "0" is set in an area of a mobile terminal 40 which is not communicating with terminal 40. For example, according to FIG. 9, it is found that mobile terminal 40a is communicating with mobile terminals 40b and 40d. To identify each mobile terminal 40, a terminal identification address of each terminal 40 may be used. As described above, a communication status of each mobile terminal 40 is registered in communication chart 205b as a communication status record.

HD 205 stores an information management program. The program is executed by CPU 201 to cause management server 20 to realize the following functions.

Management server 20, upon receiving from AR 30 an assignment permit request message requesting permission of assigning a packet transfer address to mobile terminal 40, sends to AR 30, in response to the message, an assignment permit message notifying permission of the assignment, in a case where server 20 permits communication of terminal 40. Server 20, upon receiving from AR 30 an address notification message including a terminal identification address and a packet transfer address of terminal 40, registers in administrative cache 205a, an address management record, which includes the terminal identification address and the packet transfer address of terminal 40.

Management server 20, upon receiving from AR 30 an address inquiry message to inquire about a packet transfer address of a destination terminal, reads the packet transfer address from administrative cache 205a, and identifies another AR 30 linked to the destination terminal. Server 20 then sends to the identified AR 30, a terminal entry creation request message requesting the registering of a destination terminal record of a source terminal in accordance with the destination terminal. It should be noted that because the source terminal is deemed to be a destination terminal for the identified AR 30, server 20 requests AR 30 to register address binding information of the source terminal as a destination terminal record.

Server 20 then writes in communication status records of the destination terminal and the source terminal, information indicating that the terminals are communicating with each other. Server 20 sends to AR 30 an address response message including the packet transfer address read from administrative cache 205a.

In a case where server 20 receives from AR 30 the address inquiry message, and the address management record of the destination terminal has not been registered in administrative cache 205a, server 20 sends to a location information management server (not shown) for managing locations of mobile terminals which are not communicating currently, a location inquiry message inquiring a location of the destination terminal. Server 20, upon receiving from the location information management server, as a response to the message, a location response message including location information of the destination terminal, identifies AR 30 that can be linked to the destination terminal on the basis of the location information. Server 20 sends to the identified AR 30 an address request message requesting the identified AR 30 to assign a packet transfer address to the destination terminal. As a response to the message, server 20 receives from AR 30 an address response message including a packet transfer address of the destination terminal, thereby acquiring the packet transfer address of the destination terminal. Server 20 registers in administrative cache 205a an address management record including address binding information of the destination terminal and the address of AR 30. Server 20 also registers in communication chart 205b a communication status record of the destination terminal, and writes in the communication status records of the destination terminal and the source terminal, information indicating that the terminals are communicating with each other.

Management server 20, upon receiving from AR 30 an address-management-record release request message pertaining to mobile terminal 40, identifies other mobile terminals 40 which have communicated with terminal 40 with reference to communication chart 205b. Server 20 then identifies other ARs 30 linked to other terminals 40 with reference to administrative cache 205a. Server 20 then sends to each of the other ARs 30 a terminal entry deletion request message pertaining to terminal 40. It should be noted that when management server 20 requests a single AR 30 to delete destination terminal records of a plurality of mobile terminals 40 which terminate communication, the terminal identification addresses of the plurality of terminals 40 may be designated in the option field of a terminal entry deletion request message. With the above configuration, it becomes possible to request deletion of the destination terminal records of a plurality of mobile terminals 40 by a single message.

Server 20, upon receiving a deletion completion message from each of the other ARs 30, deletes the address management record of terminal 40 from administrative cache 205a, and deletes the communication status record of terminal 40 from communication chart 205b. Server 20 sends to AR 30 which has sent the address-management-record release request message, a release request response message in a response to the request message.

Configuration of Mobile Terminal:

Mobile terminal 40 has the following functions. Mobile terminal 40, when initiating packet communication, sends a communication initiation request message requesting initiation of communication to AR 30 covering a wireless area where terminal 40 is located. Terminal 40, upon receiving from AR 30 a communication permit message as a response to the request message, becomes capable of performing communication.

Mobile terminal 40, when sending a packet, sets a terminal identification address of terminal 40 in a source terminal address of the packet, and sets in a destination address of the packet, a terminal identification address of mobile terminal 40 to which the packet is addressed. Terminal 40 then sends the resultant packet.

2. Operation

Below described are operations of mobile terminal 40, AR 30, and management server 20 with reference to FIGS. 10 to 12. In the following description, it is assumed that mobile terminal 40a, mobile terminal 40b, and mobile terminal 40c are linked to AR 30a, AR 30b, and AR 30c, respectively.

Figure 10:
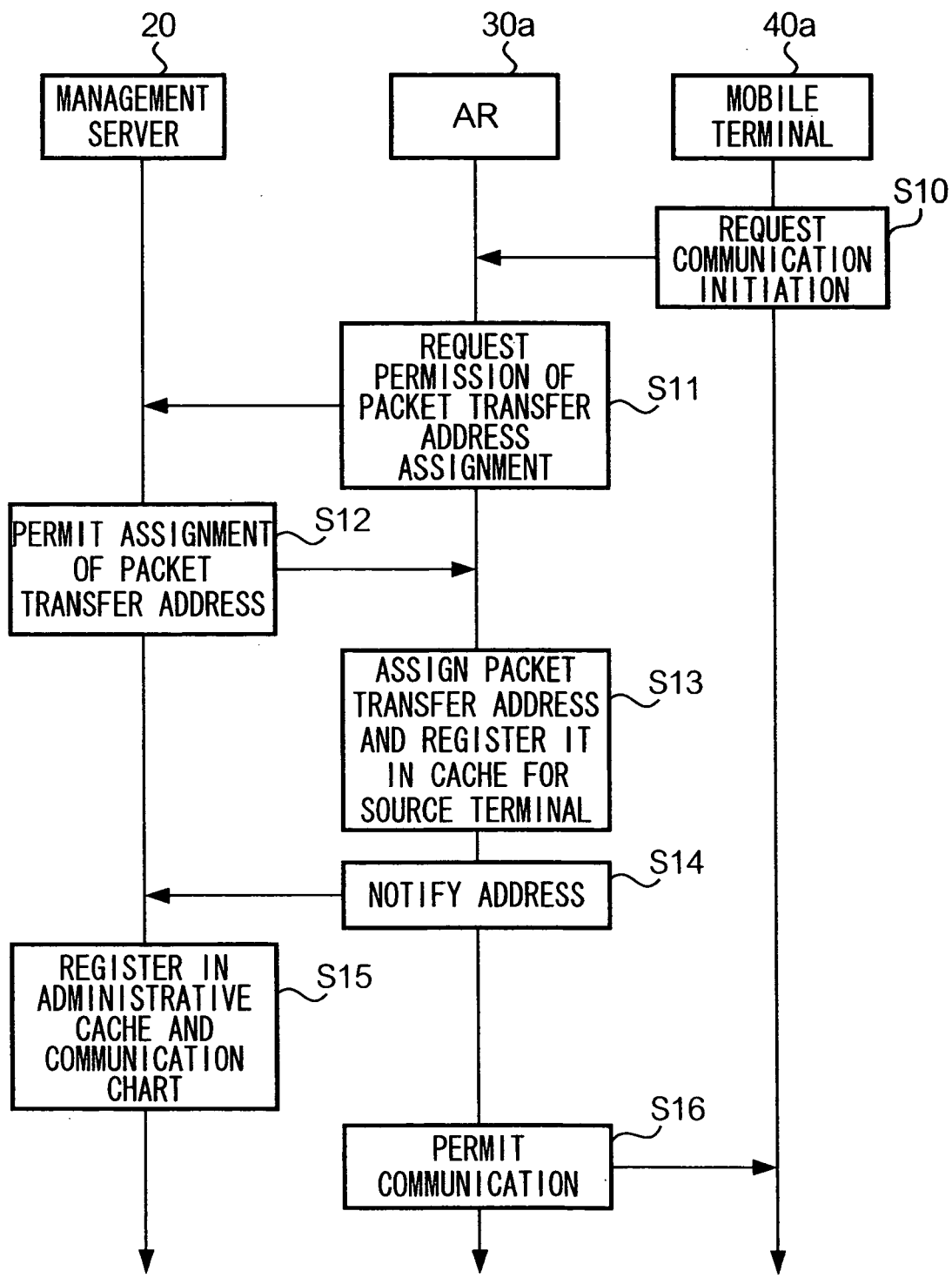
FIG. 10 is a flowchart illustrating an example operation of communication system 1 according to the embodiment.

Operation of Communication Initiation:

Following is a description, of operations of devices when mobile terminal 40a initiates communication, with reference to FIG. 10.

Mobile terminal 40a sends a communication initiation request message to AR 30a covering a wireless area where terminal 40a is located (Step 10). AR 30a, upon receiving the message, sends to management server 20 an assignment permit request message requesting permission of assigning a packet transfer address to terminal 40a (Step 11). Server 20, upon receiving the message, permits communication of terminal 40a in this operation example, sends to AR 30a an assignment permit message in response to the request message (Step 12).

Figure 13:
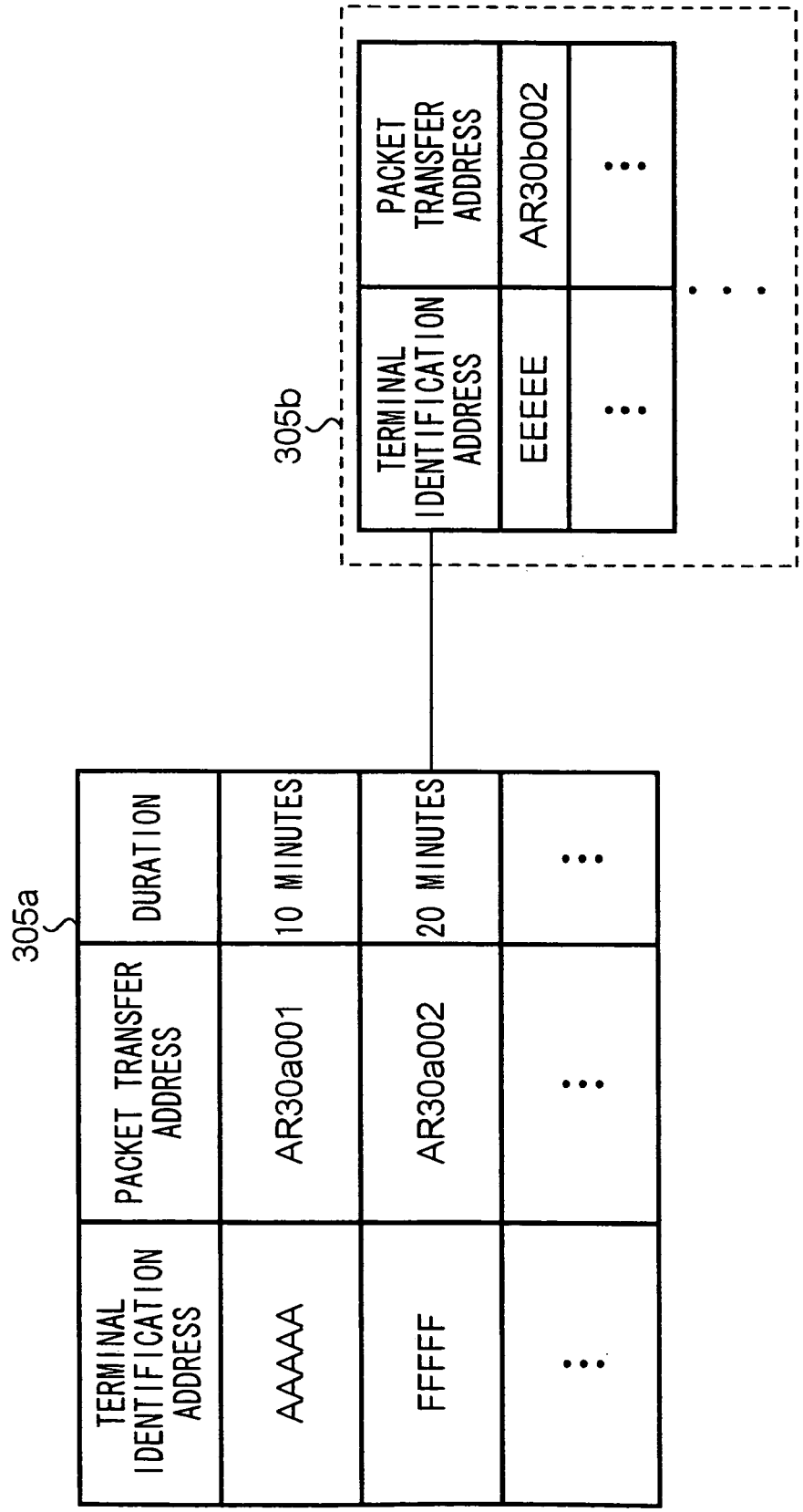
FIG. 13 is a diagram showing an example of cache for source terminal 305a and cache for destination terminal 305b stored in AR 30a according to the embodiment.

AR 30a, upon receiving the message, assigns a packet transfer address to terminal 40a. AR 30a then registers in cache for source terminal 305a, a source terminal record including the terminal identification address of terminal 40a included in the communication initiation request message, the assigned packet transfer address, and time information indicating duration (Step 13). As a result, cache for source terminal 305a results in the one as shown in FIG. 13. AR 30a sends to server 20 an address notification message including the terminal identification address and the packet transfer address (Step 14). AR 30a also sends to terminal 40a, a communication permit message notifying permission of communication initiation (Step 16).

Server 20, upon receiving the address notification message, registers in administrative cache 205a, an address management record including the terminal identification address and the packet transfer address of terminal 40a included in the message. Server 20 also registers in communication chart 205b, a communication status record of terminal 40a (Step 15). As a result, administrative cache 205a results in the one as shown in FIG. 8, and communication chart 205b results in the one as shown in FIG. 14.

It should be noted that after the process of Step 15, server 20 may send to AR 30a, in response to the address notification message, a response message notifying that the registrations of the address management record and the communication status record of terminal 40a have been completed. In this case, AR 30a performs the process of Step 16 after receiving the response message.

Figure 11:
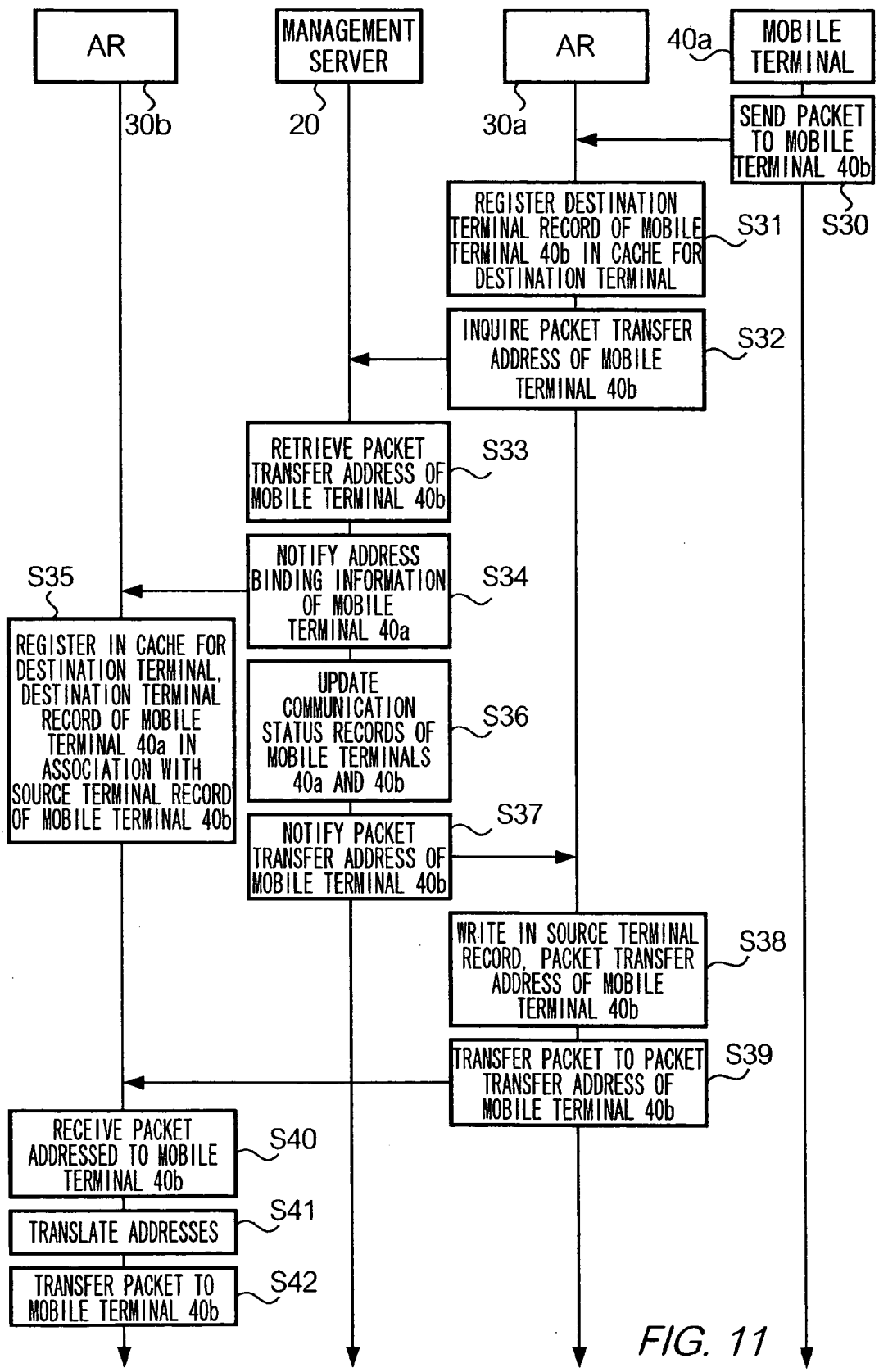
FIG. 11 is a flowchart illustrating an example operation of communication system 1 according to the embodiment.
Figure 23:
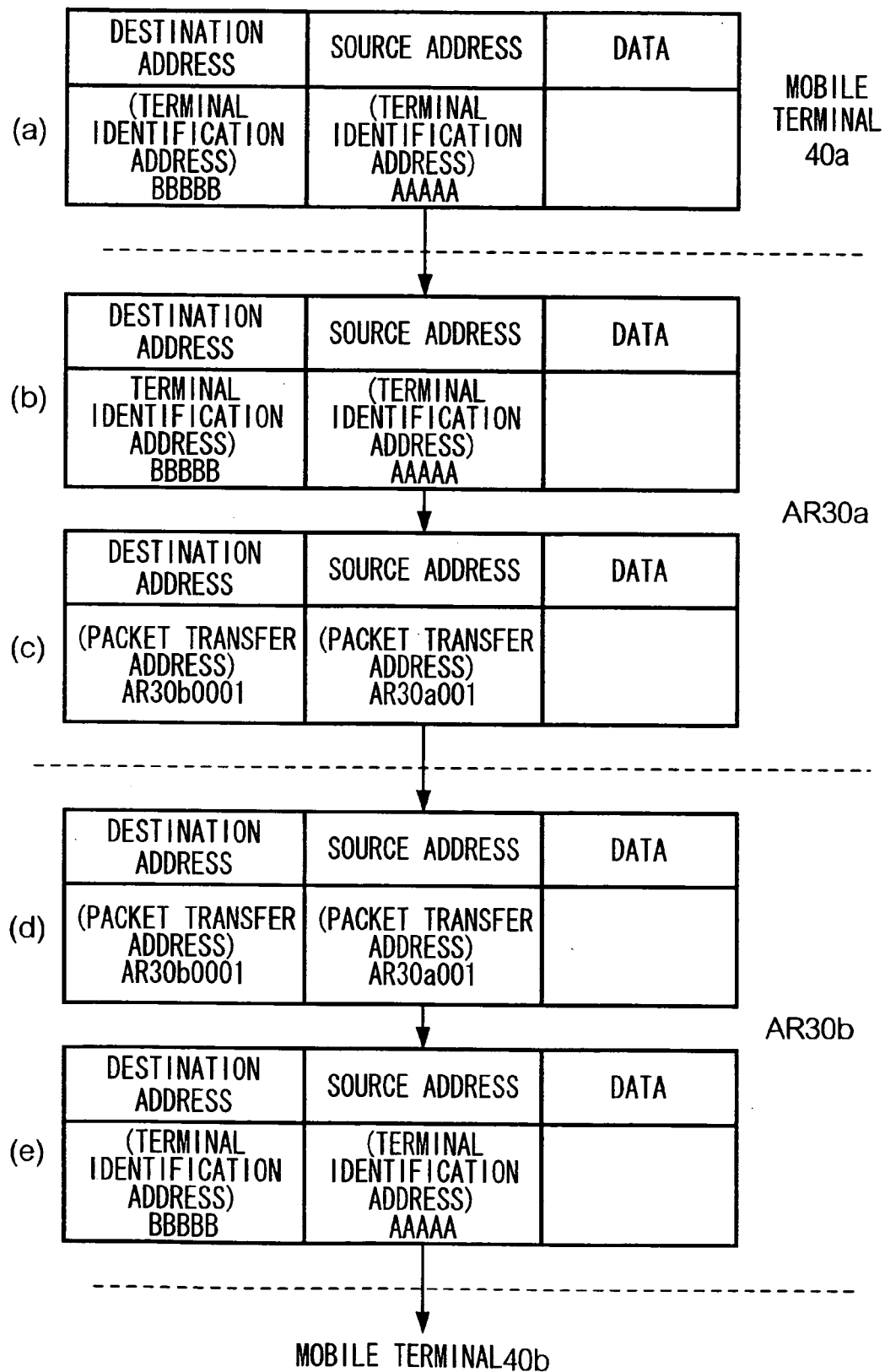
FIG. 23 is a diagram showing changes in a packet sent from mobile terminal 40a according to the embodiment.

Operation of Communication:

Following is a description, of operations of devices when mobile terminal 40a sends a packet to mobile terminal 40b, with reference to FIG. 11. FIG. 23 shows changes in a packet sent from terminal 40a. In the drawing, the packet is shown conceptually, as including a destination terminal address, a source terminal address, and data.

Mobile terminal 40a sends a packet (see FIG. 23(a)) to mobile terminal 40b (Step 30). AR 30a, upon receiving the packet, determines whether a destination terminal record including a terminal identification address (in this operation example, a terminal identification address of terminal 40b) designated in a destination address of the packet has been registered in cache for destination terminal 305b in accordance with a source terminal record of terminal 40a. Assumed that the determination is No, AR 30a registers in cache for destination terminal 305b, a destination terminal record including the terminal identification address, in accordance with the source terminal record of terminal 40a (Step 31). As a result, cache for destination terminal 305b results in the one as shown in FIG. 15. AR 30a then sends to management server 20 an address inquiry message to inquire about the packet transfer address corresponding to the terminal identification address of terminal 40b (Step 32).

Server 20, upon receiving the message, reads from administrative cache 205a, an address management record including the terminal identification address on the basis of the terminal identification address included in the message. Server 20 then reads from the record the packet transfer address (Step 33). In this operation example, it is assumed that the address management record including the packet transfer address has been registered in administrative cache 205a.

Server 20 also identifies AR 30 linked to the destination terminal (in this operation example, AR 30b) with reference to the address management record, and sends to AR 30b, a terminal entry creation request message pertaining to terminal 4a0 (Step 34). The message includes the terminal identification address of terminal 40b, and the terminal identification address and the packet transfer address of terminal 40a.

Server 20 writes in communication status records of terminals 40a and 40b registered in communication chart 205b, information indicating that terminals 40a and 40b are communicating with each other (Step 36). As a result, communication chart 205b results in the one as shown in FIG. 16. Server 20 sends to AR 30a an address response message including the packet transfer address read in Step 33 (Step 37).

AR 30b, upon receiving the terminal entry creation request message sent from server 20 in Step 34, creates a destination terminal record including the terminal identification address and the packet transfer address of terminal 40a included in the message. In this operation example, it is assumed that a source terminal record of terminal 40b has already been registered in cache for source terminal 305a. AR 30b registers in cache for destination terminal 305b, the destination terminal record in accordance with the source terminal record of terminal 40b identified by the message (Step 35).

AR 30a, upon receiving the address response message sent from server 20 in Step 37, writes the packet transfer address included in the message in the destination terminal record of terminal 40b registered in cache for destination terminal 305b (Step 38). As a result, cache for destination terminal 305b results in the one as shown in FIG. 17.

AR 30a translates the source address of the packet into the packet transfer address of terminal 40a; translates the destination address of the packet into the packet transfer address of terminal 40b; and sends the resultant packet (see FIG. 23(c)) (step S39). Consequently, AR 30a translates, from the terminal identification addresses (see FIG. 23(b)), the destination address and the source address of the packet received from terminal 40a, into packet transfer addresses (see FIG. 23(c)).

The packet sent in Step 39 is received by AR 30b (Step 40). AR 30b then reads the terminal identification address corresponding to the packet transfer address of terminal 40b designated in the destination address of the packet, with reference to cache for source terminal 305a stored in AR 30b. AR 30b also reads with reference to cache for destination terminal 305b, the terminal identification address corresponding to the packet transfer address of terminal 40a, from the destination terminal record of terminal 40a registered in accordance with the source terminal record of terminal 40b registered in cache for source terminal 305a. AR 30b then translates the destination address of the packet into the acquired terminal identification address of terminal 40b, and translates the source address of the packet into the acquired terminal identification address of terminal 40a (Step 41). AR 30b then sends the resultant packet (see FIG. 23(e)) (Step 42). Consequently, AR 30b translates, from the packet transfer addresses (see FIG. 23(d)), the destination address and the source address of the packet received from terminal 40a, into terminal identification addresses (see FIG. 23(e)).

It should be noted that after the process of Step 35, AR 30b may send to server 20, in response to the terminal entry creation request message, a response message notifying that the registration of the destination terminal record of terminal 40a has been completed. In this case, server 20 performs the process of Step 36 after receiving the response message.

Figure 12:
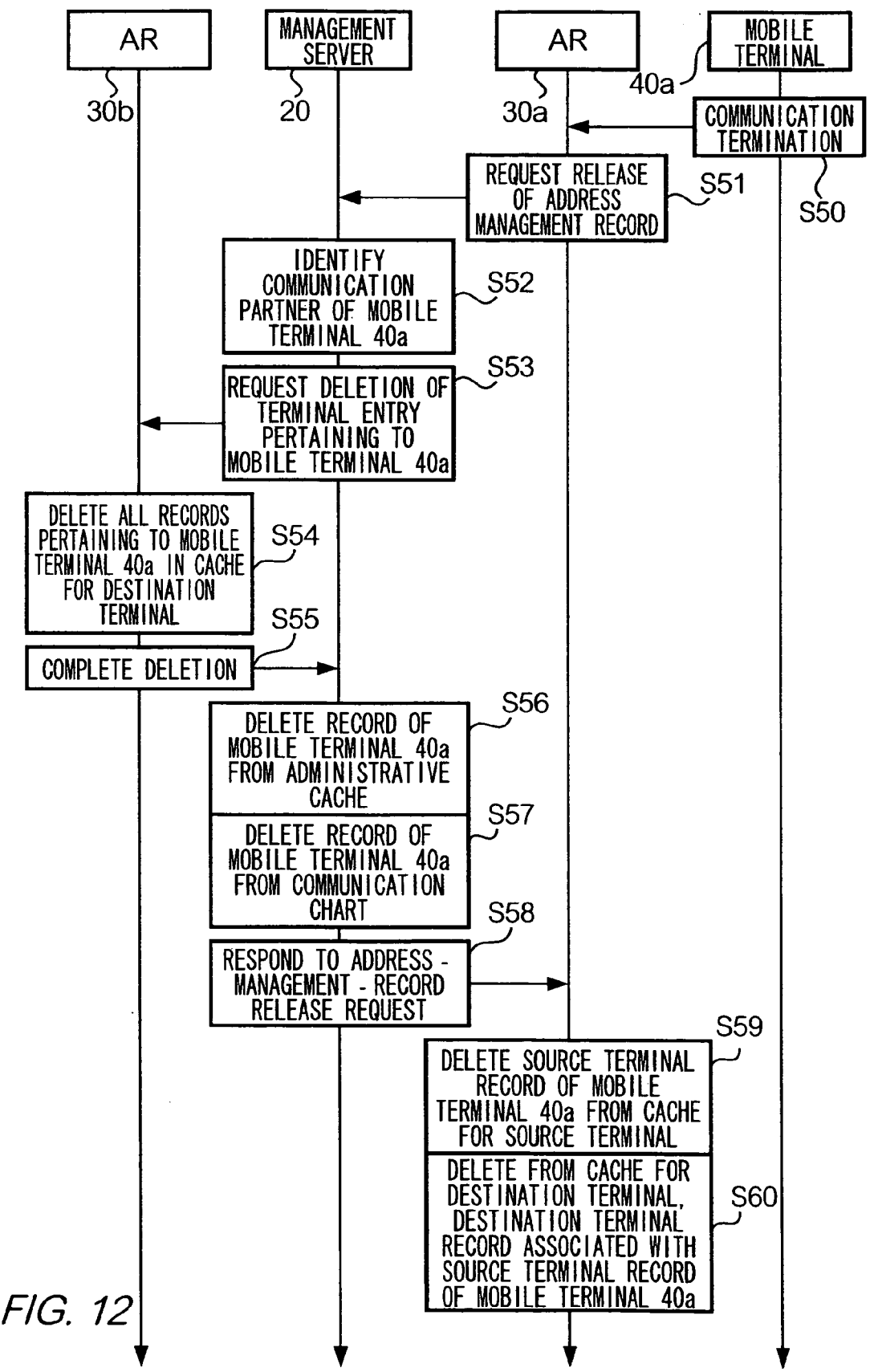
FIG. 12 is a flowchart illustrating an example operation of communication system 1 according to the embodiment.
Figure 18:
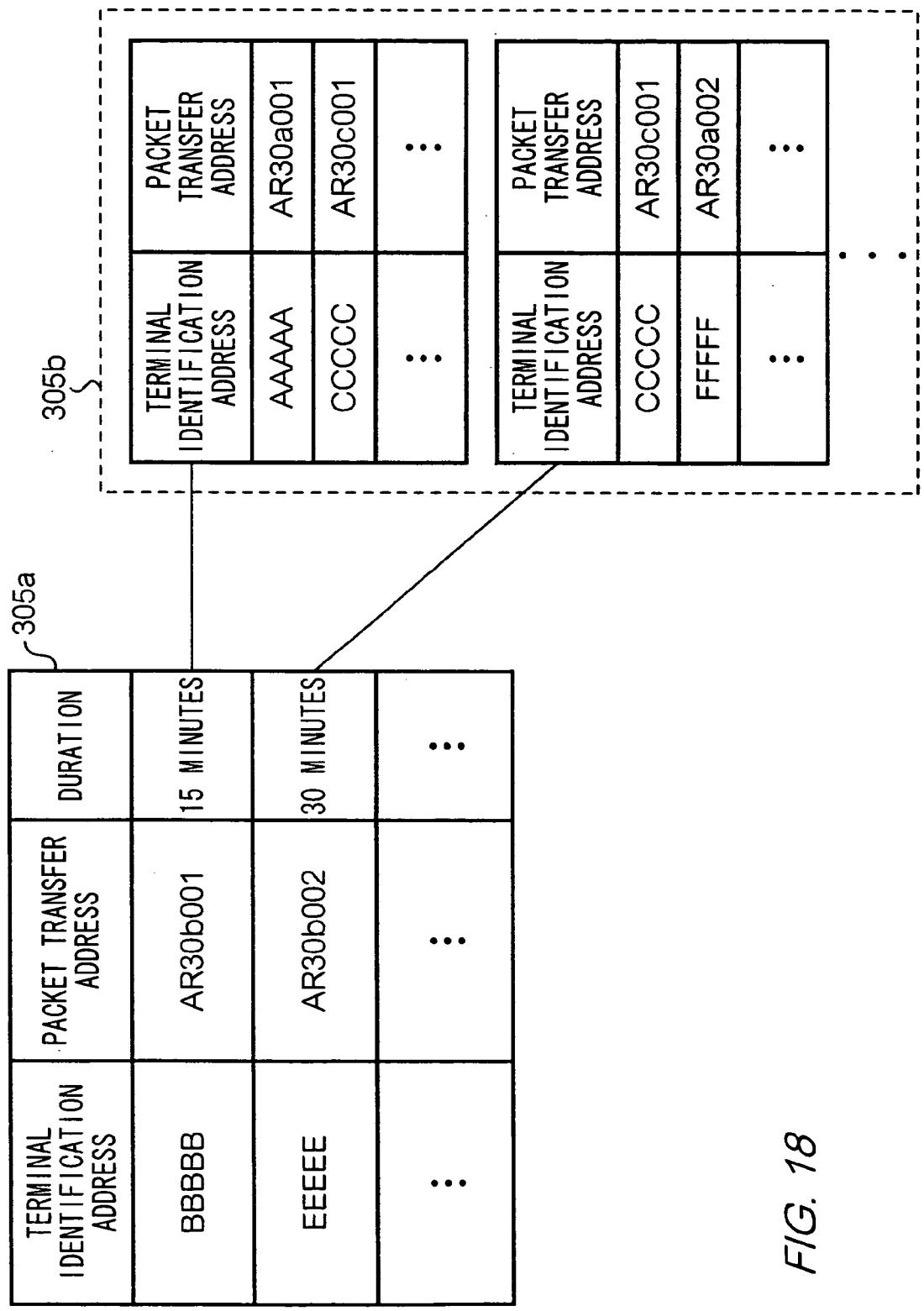
FIG. 18 is a diagram showing an example of cache for source terminal 305a and cache for destination terminal 305b stored in AR 30b according to the embodiment.

Operation of Communication Termination:

Following is a description, of operations of devices when mobile terminal 40a terminates communication, with reference to FIG. 12. In this operation example, it is assumed that terminal 40a exchanges packets with mobile terminals 40b and 40d. Consequently, in cache for destination terminal 305b stored in AR 30b, a destination terminal record of terminal 40a has been registered in accordance with a source terminal record of terminal 40b (see FIG. 18). Similarly, in cache for destination terminal 305b stored in AR 30d, a destination terminal record of terminal 40a has been registered in accordance with a source terminal record of terminal 40d.

Mobile terminal 40a sends a communication termination message (Step 50). AR 30a, upon receiving the message, sends to management server 20 an address-management-record release request message (Step 51).

Server 20, upon receiving the message, identifies mobile terminals 40 which have communicated with terminal 40a (in this operation example, mobile terminals 40b and 40d) with reference to communication chart 205b (Step 52). Server 20 then identifies ARs 30 linked to terminals 40b and 40d (in this operation example, ARs 30b and 30d) with reference to administrative cache 205a. Server 20 then sends to each of ARs 30b and 30d a terminal entry deletion request message pertaining to terminal 40a (Step 53). The message includes a terminal identification address of terminal 40a.

Figure 20:
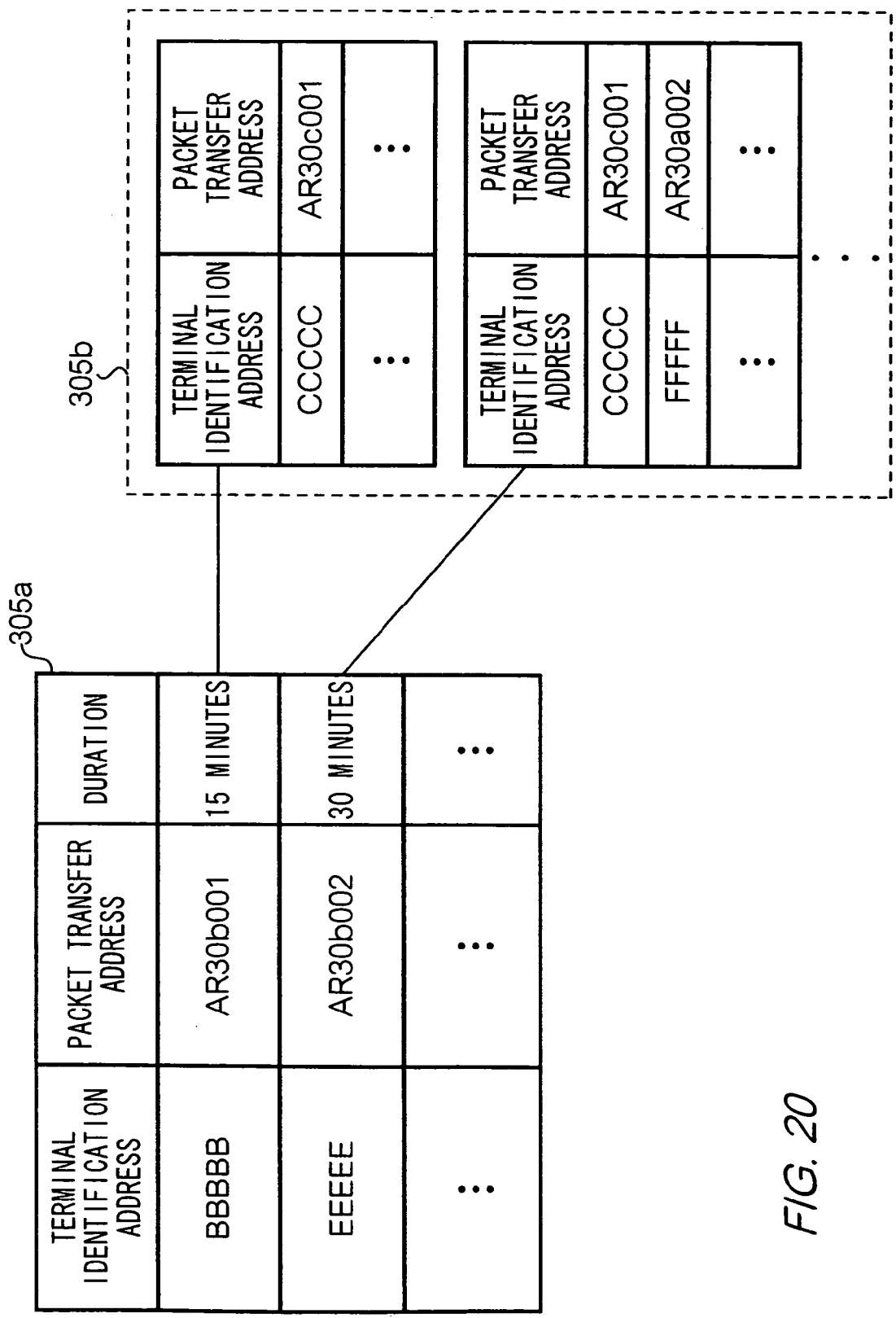
FIG. 20 is a diagram showing an example of cache for source terminal 305a and cache for destination terminal 305b stored in AR 30b according to the embodiment.

AR 30b, upon receiving the message, deletes the destination terminal record of terminal 40a from cache for destination terminal 305b on the basis of the terminal identification address of terminal 40a included in the message (Step 54). As a result, cache for source terminal 305a and cache for destination terminal 305b of AR 30b are changed from those of FIG. 18 to those of FIG. 20. AR 30b sends to server 20 a deletion completion message notifying completion of the deletion (Step 55).

Description of operations of AR 30d will be omitted, because AR 30d performs similar operations to those of AR 30b.

Server 20, upon receiving deletion completion messages from ARs 30b and 30d to which terminal entry deletion request messages are sent, deletes an address management record of terminal 40a from administrative cache 205a (Step 56), and deletes a communication status record of terminal 40a from communication chart 205b (Step 57). As a result, administrative cache 205a is changed from that of FIG. 8 to that of FIG. 21. Similarly, communication chart 205b is changed from that of FIG. 9 to that of FIG. 22.

Server 20 sends to AR 30a which has sent the address-management-record release request message, a release request response message in a response to the request message (Step 58).

Figure 19:
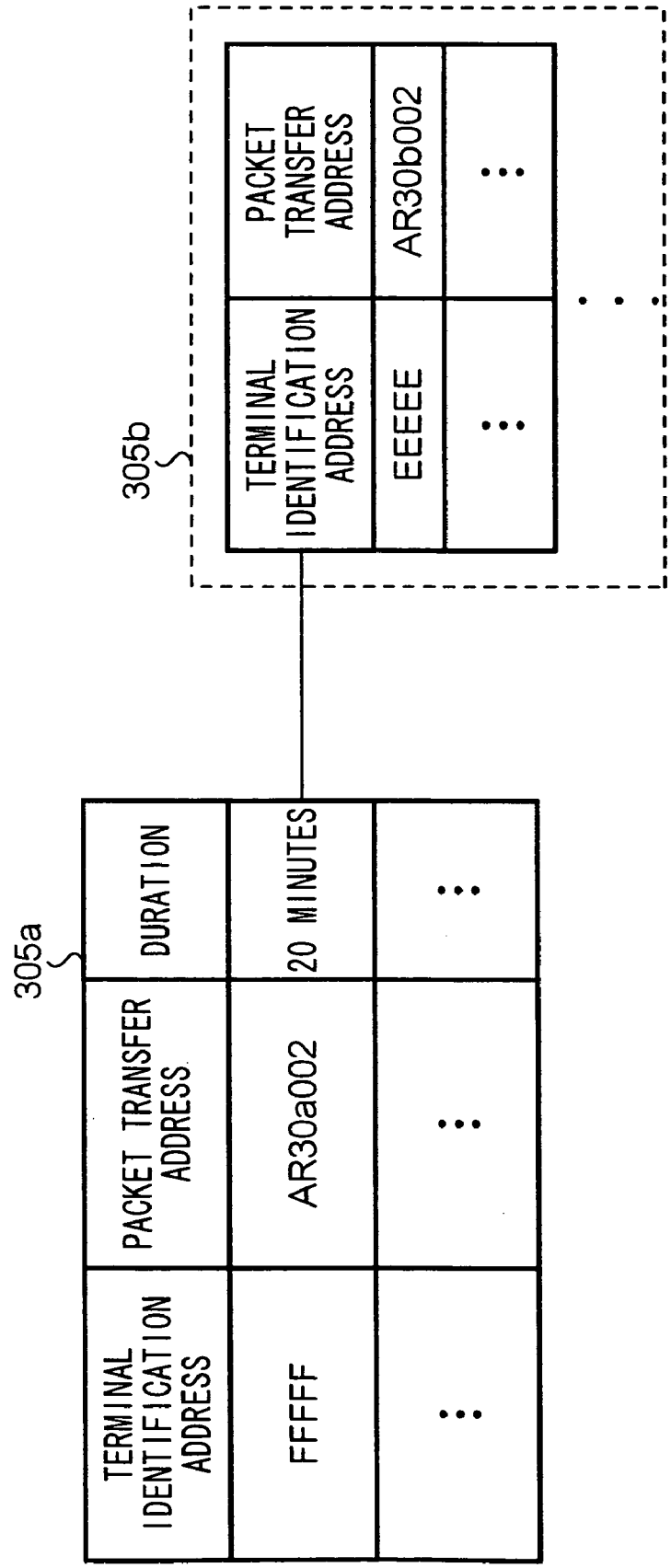
FIG. 19 is a diagram showing an example of cache for source terminal 305a and cache for destination terminal 305b stored in AR 30a according to the embodiment.

AR 30a, upon receiving the message, deletes the source terminal record of terminal 40a registered in cache for source terminal 305a (Step 59). AR 30a further deletes all destination terminal records registered in cache for destination terminal 305b in accordance with the source terminal record of terminal 40a (Step 60). As a result, cache for source terminal 305a and cache for destination terminal 305b are changed from those of FIG. 17 to those of FIG. 19.

In a case where duration in the destination terminal record of the terminal 40a elapses before AR 30a receives a communication initiation request message from terminal 40a, all of the processes of Steps 51 to 60 are carried out except for that of Step 50.

As in a manner described above, in mobile communication network 10 that mediates packets by inter-translating a packet transfer address and a terminal identification address, information on the addresses of mobile terminals communicating with each other are associated, and managed depending on a communication status. Consequently, it becomes possible to prevent from remaining in a memory, unnecessary information on addresses of mobile terminals which have terminated communication, thereby saving memory capacity.

In a configuration where ARs 30 work in cooperation with management server 20, the burden of managing address binding information can be reduced. In a configuration where by a single address-management-record release request message, all information on a mobile terminal designated by the message can be deleted in mobile communication network 10, communications traffic can be reduced.

In a configuration where AR 30 stores not only address binding information of mobile terminal 40 linked to AR 30 but also address binding information of communication partners of terminal 40, the number of messages for inquiring of management server 20 about information on addresses of each mobile terminal 40 can be reduced.

Even in a case where mobile terminal 40 moves out of a communication area covered by AR 30, for example, from that of AR 30a to that of AR 30c, AR 30c, by performing the operations as shown in FIGS. 10 to 12, can manage address binding information of terminal 40 and address binding information of communication partners of terminal 40, as AR 30a does.

3. Modifications

In the foregoing, the embodiment of the present invention has been described. The present invention can be implemented in various other embodiments without departing from the main characteristic of the invention. For example, modifications such as the following are possible.

Modification 1:

Mobile communication network 10 may comprise a plurality of routers which have similar functions to AR 30 as described above and are configurable hierarchically or in a multi-layered manner. For example, mobile communication network 10 may further comprise anchor routers (not shown) for transferring packets between a plurality of ARs 30. In the configuration, assigned to each mobile terminal 40 are a first packet transfer address for use between ARs 30 and a second packet transfer address for use between anchor routers. ARs 30 store correspondences between terminal identification addresses and first packet transfer addresses of mobile terminals 40. Anchor routers store correspondences between first packet transfer addresses and second packet transfer addresses of mobile terminals 40. Management server 20 stores correspondences between terminal identification addresses and first packet transfer addresses and second packet transfer addresses of mobile terminals 40. Management server may manage more than three addresses assigned to mobile terminal 40.

Mobile communication network 10 may also comprise gateway routers having similar functions to those of AR 30, in a case where mobile terminals 40 communicate with external networks.

Modification 2:

In the above embodiment, management server 20, instead of AR 30, may have a function of assigning packet transfer addresses to mobile terminals 40 linked to server 20.

Modification 3:

Mobile communication network 10 may further comprise a communication management server (not shown). In a case where the communication management server, instead of management server 20, stores communication chart 205b, the communication management server manages chart 205b in cooperation with server 20.

Configuration 4:

When messages are exchanged between ARs 30 or between AR 30 and management server 20, a hash function such as MD5, a public key infrastructure, or an Internet key exchange may be used. Thus, the security of communication can be improved between ARs 30 or between AR 30 and management server 20.

Modification 5:

In the above embodiment, AR 30 may be provided by communication with programs for causing AR 30 to execute the processes as shown in FIGS. 10 to 12, instead of pre-storing the programs in ROM 302 or HD 305. AR 30 may also be provided with the programs stored in storage media.

Modification 6:

In the above embodiment, as a packet transfer address, an address is assigned to mobile terminal 40, by which it is possible for terminal 40 to be uniquely identified by AR 30 linked to terminal 40. Instead, as a packet transfer address, the address itself of AR 30 linked to mobile terminal 40 may be assigned to terminal 40. In this configuration, a packet is encapsulated with the address of AR 30 linked to a source terminal or the address of another AR 30 linked to a destination terminal. Thus, the configuration of administrative cache 205a stored in management server 20 can be further simplified.

Modification 7:

Cache for source terminal 305a and cache for destination terminal 305b may be stored in physically separated memories, or in a logically separated memory. Each destination terminal record registered in cache for destination terminal 305b may be registered in cache 305b as a separate record for each source terminal record, or registered in physically separated memories.

Modification 8:

In the above embodiment, AR 30 assigns a packet transfer address to mobile terminal 40, after receiving from management server 20 an assignment permit message notifying permission of the assignment. Instead, AR 30, without asking management server 20 for permission of assigning a packet transfer address, may assign a packet transfer address to mobile terminal 40 in response to a communication initiation request message from terminal 40. In this case, AR 30 then notifies server 20 of the packet transfer address.

Modification 9:

Mobile terminal 40, before sending a packet, may notify AR 30 linked to terminal 40 of a terminal identification address of a destination terminal to which the packet is addressed. In this configuration, AR 30, on the basis of the notification, inquires of management server 20 the packet transfer address corresponding to the terminal identification address, and acquires the packet transfer address from server 20.

Modification 10:

In the above embodiment, mobile terminal 40, instead of AR 30, may send to management server 20 an address-management-record release request message directly.

Modification 11:

In the above embodiment, AR 30 deletes a source terminal record and destination terminal records of a mobile terminal which terminates communication after sending to management server 20 an address-management-record release request message. Instead, AR 30 may send to server 20 the address-management-record release request message, after deleting the records.

Modification 12:

In the above embodiment, AR 30, in response to a communication initiation request message from mobile terminal 40, assigns to terminal 40 a packet transfer address, which is assigned only during communication. Instead, even in a case where mobile terminals 40 do not send communication initiation request messages, AR 30 may assign packet transfer addresses to mobile terminals 40 which are located in a wireless area of AR 30 and can initiate communication.

Modification 13:

In the above embodiment, it is possible that AR 30 does not translate to a packet transfer address a terminal identification address designated in a source address of a packet sent from mobile terminal 40.

As explained above, according to the present invention, it becomes possible in a communication network that mediates packets between mobile terminals, to avoid a significant increase in traffic, solve the problem of having to provide huge-capacity memories, and avoid packet losses due to changes of packet transfer addresses.

What is claimed is:

1. A communication system comprising:
   a plurality of relay devices each of which has a relay memory and modifies packets sent from mobile terminals linked to said each relay device on the basis of content stored in said relay memory; and
   a management device having a management memory,
   wherein each of said plurality of relay devices comprises:
   first means for acquiring and storing in said relay memory, address binding information indicating correspondence between a static communication address uniquely pre-assigned to a mobile terminal linked to said relay device and a dynamic communication address assigned to said mobile terminal while located in a communication area covered by said relay device;
   second means for sending to said management device, destination terminal information indicating a destination address of a packet sent from said mobile terminal, receiving destination terminal information replied from said management device, and storing as address binding information of a communication partner of said mobile terminal, in association with said address binding information, address binding information indicating correspondence between said destination address and a dynamic communication address indicated by said received destination terminal information;
   third means, when said mobile terminal terminates communication, for releasing in said relay memory a memory area storing said address binding information of said mobile terminal and a memory area storing said address binding information of said communication partner associated with said address binding information of said mobile terminal, and requesting said management device to delete said address binding information of said mobile terminal; and fourth means, when requested by said management device to delete address binding information of another mobile terminal which is linked to another relay device and terminates communication, for releasing in said relay memory a memory area storing said address binding information of said another mobile terminal associated with said address binding information of said mobile terminal, said management device comprises:

fifth means, in a network having a plurality of relay devices each of which is linked to mobile terminals, for storing in the management memory, address binding information indicating correspondence between static communication addresses assigned to said mobile terminals and dynamic communication addresses assigned to said mobile terminals, and communication status information indicating communication partners of said mobile terminals;

sixth means, when receiving from a relay device, destination terminal information of a packet sent from a mobile terminal linked to said relay device, for reading from said management memory, a dynamic communication address corresponding to a destination address indicated by said destination terminal information, and sending to said relay device, destination terminal information indicating said dynamic communication address; and seventh means, when requested by a relay device to delete address binding information of a mobile terminal which terminates communication, for identifying a communication partner of said mobile terminal on the basis of communication status information of said mobile terminal stored in said management memory, for identifying a relay device linked to said communication partner on the basis of address binding information of said communication partner stored in said management memory, for requesting said relay device to delete said address binding information of said communication terminating mobile terminal, and for releasing in said management memory a memory area storing said address binding information of said communication terminating mobile terminal and a memory area for storing said communication status information of said communication terminating mobile terminal.

2. A communication system according to claim 1, wherein:

said first means, when requested to initiate communication by said mobile terminal located in a communication area covered by said relay device, acquires said dynamic communication address of said mobile terminal; links said relay device with said mobile terminal by permitting said mobile terminal to initiate communication; stores in said relay memory, said address binding information of said mobile terminal indicating correspondence between said static communication address and said dynamic communication address; and sends said address binding information to said management device;

said fifth means, when receiving said address binding information of said mobile terminals from said plurality of relay devices, stores in said management memory, said address binding information in accordance with identification information specifying said plurality of relay devices which have sent said address binding information; and said sixth means, when receiving said destination terminal information from said relay device, stores in said management memory, communication status information indicating that a mobile terminal, to which is assigned said destination address indicated by said destination terminal information, and said packet sending mobile terminal are communicating with each other.

3. A communication system according to claim 1, wherein:

said sixth means, when said management memory does not store said dynamic communication address corresponding to said destination address indicated by said destination terminal information, identifies a relay device that can be linked to a mobile terminal to which said destination address is assigned; requests said relay device to acquire said dynamic communication address corresponding to said destination address of said mobile terminal; and stores in said management memory, in accordance with identification information specifying said relay device, address binding information indicating correspondence between said destination address and said dynamic communication address sent from said mobile terminal; and said relay device further comprises eighth means, when requested by said management device to acquire a dynamic communication address corresponding to a destination address indicated by destination terminal information, for requesting a mobile terminal to initiate communication to which said destination address is assigned; linking said relay device with said mobile terminal by acquiring a dynamic communication address of said mobile terminal;

storing in said relay memory, address binding information indicating correspondence between said destination address and said dynamic communication address of said mobile terminal; and sending said address binding information to said management device.

4. A communication system according to claim 1, wherein:

said sixth means, when receiving said destination terminal information from said relay device, identifies a relay device linked to a mobile terminal to which said destination address indicated by said identification information is assigned; and requests said relay device to store in accordance with address binding information of said mobile terminal, address binding information of said packet sending mobile terminal; and said relay device further comprises ninth means, when requested by said management device to store in accordance with said address binding information of said mobile terminal, address binding information of another mobile terminal sending to a packet to said mobile terminal, for storing in said relay memory, said address binding information of said another mobile terminal in accordance with said address binding information of said mobile terminal.

5. An address management method comprising:

a first step of, in a network having a plurality of relay devices each of which is linked to mobile terminals, storing, with a management device having a management memory, in the management memory, address binding information indicating correspondence between static communication addresses uniquely preassigned to said mobile terminals and dynamic communication addresses assigned to said mobile terminals while located in communication areas covered by said plurality of relay devices, and communication status information indicating communication partners of said mobile terminals;

a second step of acquiring and storing, with a first relay device having a relay memory, in said relay memory, address binding information indicating correspondence between a static communication address assigned to a first mobile terminal linked to said first relay device, and a dynamic communication address assigned to said first mobile terminal;

a third step of sending, with said first relay device, to said management device, destination terminal information indicating a destination address of a packet sent from said first mobile terminal;

a fourth step of, when receiving said destination terminal information from said first relay device, reading, with said management device, from said management memory a dynamic communication address corresponding to said destination address indicated by said destination terminal information, and sending to said first relay device, destination terminal information indicating said dynamic communication address;

a fifth step of receiving, with said first relay device, said destination terminal information replied from said management device, and storing as address binding information of a communication partner of said first mobile terminal, in association with said address binding information, address binding information indicating correspondence between said destination address and said dynamic communication address indicated by said received destination terminal information;

a sixth step of, when said first mobile terminal terminates communication, releasing, with said first relay device, in said relay memory a memory area storing said address binding information of said first mobile terminal and a memory area storing said address binding information of said communication partner associated with said address binding information of said first mobile terminal, and requesting said management device to delete said address binding information of said first mobile terminal;

a seventh step of, when requested by said first relay device to delete said address binding information of said first mobile terminal, identifying, with said management device, a second mobile terminal which is a communication partner of said first mobile terminal on the basis of said communication status information of said first mobile terminal stored in said management memory, identifying a second relay device linked to said second mobile terminal on the basis of address binding information of said second mobile terminal stored in said management memory, sending to said second relay device a request for deleting said address binding information of said second mobile terminal along with information for identifying said second mobile terminal, and releasing in said management memory a memory area storing said address binding information of said first mobile terminal and a memory area for storing said communication status information of said first mobile terminal; and an eighth step of, when receiving said request and said information for identifying said second mobile terminal, releasing, with said second mobile terminal, a memory area storing said address binding information of said first mobile terminal associated with address binding information of said second mobile terminal.

6. An address management method according to claim 5, wherein:

in said second step, said first relay device, when requested to initiate communication by said first mobile terminal located in a communication area covered by said first relay device, acquires said dynamic communication address of said first mobile terminal; links with said first mobile terminal by permitting said first mobile terminal to initiate communication; stores in said relay memory, said address binding information of said first mobile terminal indicating correspondence between said static communication address and said dynamic communication address; and sends to said management device said address binding information, to cause said management device to store said address binding information in accordance with information for identifying said first relay device; and in said fourth step, said management device, when receiving said destination terminal information from said first relay device, stores in said management memory, communication status information indicating that a mobile terminal, to which said destination address indicated by said destination terminal information is assigned, and said first mobile terminal are communicating with each other.

7. A address management method according to claim 5, wherein, in said fourth step, said management device, when said management memory does not store a dynamic communication address corresponding to said destination address indicated by said destination terminal information, identifies a relay device that can be linked to a mobile terminal to which said destination address is assigned; requests said relay device to acquire said dynamic communication address corresponding to said destination address of said mobile terminal; and stores in said management memory, in accordance with identification information identifying said relay device, address binding information indicating correspondence between said destination address and said dynamic communication address sent from said mobile terminal, said address management method further comprising:

a ninth step of, when requested by said management device to acquire said dynamic communication address corresponding to said destination address indicated by said destination terminal information, requesting, with said relay device, said mobile terminal to initiate communication to which said destination address is assigned; linking with said mobile terminal by acquiring said dynamic communication address of said mobile terminal; storing in a relay memory of said relay device, address binding information indicating correspondence between said destination address and said dynamic communication address of said mobile terminal; and sending said address binding information to said management device.

8. An address management method according to claim 5, wherein, in said fourth step, said management device, when receiving said destination terminal information from said first relay device, identifies a relay device linked to a mobile terminal to which said destination address indicated by said identification information is assigned; and requests said relay device to store in accordance with address binding information of said mobile terminal, said address binding information of said first mobile terminal, said address management method further comprising:

a tenth step, when requested by said management device to store in accordance with said address binding information of said mobile terminal, said address binding information of said first mobile terminal, of storing in a relay memory of said relay device, said address binding information of said first mobile terminal in accordance with said address binding information of said mobile terminal.

9. A relay device which has a relay memory, and modifies and transfers packets sent from mobile terminals linked to said relay device on the basis of content stored in the relay memory, said relay device comprising:

first means for acquiring and storing in said relay memory, address binding information indicating correspondence between a static communication address uniquely pre-assigned to a mobile terminal linked to said relay device and a dynamic communication address assigned to said mobile terminal while located in a communication area covered by said relay device;

second means for sending to a management device having a management memory, destination terminal information indicating a destination address of a packet sent from said mobile terminal, for receiving destination terminal information replied from said management device, and for storing as address binding information of a communication partner of said mobile terminal, in association with address binding information of said mobile terminal, address binding information indicating correspondence between said destination address and a dynamic communication address indicated by said received destination terminal information;

third means, when said mobile terminal terminates communication, for releasing in said relay memory a memory area storing said address binding information of said mobile terminal and a memory area storing said address binding information of said communication partner associated with said address binding information of said mobile terminal, and for requesting said management device to delete said address binding information of said mobile terminal; and fourth means, when requested by said management device to delete address binding information of another mobile terminal which is linked to another relay device and terminates communication, for releasing in said relay memory a memory area storing said address binding information of said another mobile terminal associated with said address binding information of said mobile terminal.

10. A relay device according to claim 9, wherein said first means, when requested to initiate communication by said mobile terminal located in a communication area covered by said relay device, acquires said dynamic communication address of said mobile terminal; links said relay device with said mobile terminal by permitting said mobile terminal to initiate communication; stores in said relay memory, said address binding information of said mobile terminal indicating correspondence between said static communication address and said dynamic communication address; and sends said address binding information to said management device.

11. A relay device according to claim 9, further comprising:

fifth means, when requested by said management device to acquire a dynamic communication address corresponding to a destination address indicated by destination terminal information, for requesting a mobile terminal to initiate communication to which said destination address is assigned; for linking said relay device with said mobile terminal by acquiring a dynamic communication address of said mobile terminal; for storing in said relay memory, address binding information indicating correspondence between said destination address and said dynamic communication address of said mobile terminal; and for sending said address binding information to said management device.

12. A relay device according to claim 9, further comprising:

sixth means, when requested by said management device to store in accordance with said address binding information of said mobile terminal, address binding information of another mobile terminal sending to a packet to said mobile terminal, for storing in said relay memory, said address binding information of said another mobile terminal in accordance with said address binding information of said mobile terminal.

13. A management device having a management memory, comprising:

first means, in a network having a plurality of relay devices each of which is linked to mobile terminals, for storing in the management memory, address binding information indicating correspondence between static communication addresses uniquely pre-assigned to said mobile terminals and dynamic communication addresses assigned to said mobile terminals while located in communication areas covered by said plurality of relay devices, and communication status information indicating communication partners of said mobile terminals;

second means, when receiving from a relay device, destination terminal information of a packet sent from a mobile terminal linked to said relay device, for reading from said management memory, a dynamic communication address corresponding to a destination address indicated by said destination terminal information, and for sending to said relay device, destination terminal information indicating said dynamic communication address; and third means, when requested by a relay device to delete address binding information of a mobile terminal which terminates communication, for identifying a communication partner of said mobile terminal on the basis of communication status information of said mobile terminal stored in said management memory, for identifying a relay device linked to said communication partner on the basis of address binding information of said communication partner stored in said management memory, for requesting said relay device to delete said address binding information of said communication terminating mobile terminal, and for releasing in said management memory a memory area storing said address binding information of said communication terminating mobile terminal and a memory area for storing said communication status information of said communication terminating mobile terminal.

14. A management device according to claim 13, wherein:
said first means, when receiving said address binding information of said mobile terminals from said plurality of relay devices, stores in said management memory, said address binding information in accordance with identification information specifying said plurality of relay devices which have sent said address binding information; and
said second means, when receiving said destination terminal information from said relay device, stores in said management memory, communication status information indicating that a mobile terminal, to which is assigned said destination address indicated by said destination terminal information, and said packet sending mobile terminal are communicating with each other.

15. A management device according to claim 13, wherein said second means, when said management memory does not store a dynamic communication address corresponding to said destination address indicated by said destination terminal information, identifies a relay device that can be linked to a mobile terminal to which said destination address is assigned; requests said relay device to acquire a dynamic communication address corresponding to said destination address of said mobile terminal; and stores in said management memory, in accordance with identification information specifying said relay device, address binding information indicating correspondence between said destination address and said dynamic communication address sent from said mobile terminal.

16. A management device according to claim 13, wherein said second means, when receiving said destination terminal information from said relay device, identifies a relay device linked to a mobile terminal to which said destination address indicated by said identification information is assigned; and requests said relay device to store in accordance with address binding information of said mobile terminal, address binding information of said packet sending mobile terminal.

* * * * *